United States Patent [19]
Carpenter

[11] Patent Number: 5,701,517
[45] Date of Patent: Dec. 23, 1997

[54] PIPELINED ALIGNMENT SHIFTER AND METHOD FOR UNIVERSAL BIT FIELD BOUNDARY ALIGNMENT

[75] Inventor: Peter R. Carpenter, Watsonville, Calif.

[73] Assignee: Cirrus Logic, Inc., Fremont, Calif.

[21] Appl. No.: 686,479

[22] Filed: Jul. 26, 1996

Related U.S. Application Data

[63] Continuation of Ser. No. 362,296, Dec. 22, 1994, abandoned.

[51] Int. Cl.[6] .......................... G06F 13/00; G06F 13/38; G06F 5/00
[52] U.S. Cl. .......................... 395/886; 395/842; 395/898
[58] Field of Search .......................... 395/886, 842, 395/846, 310, 311, 436, 421.01, 898

[56] References Cited

U.S. PATENT DOCUMENTS

| | | | |
|---|---|---|---|
| 4,495,598 | 1/1985 | Vahlstrom et al. | 364/715.08 |
| 4,761,729 | 8/1988 | Brion | 395/886 |
| 4,782,457 | 11/1988 | Cline | 364/715.04 |
| 4,980,853 | 12/1990 | Hutchins | 395/898 |
| 5,043,935 | 8/1991 | Taniai et al. | 395/886 |
| 5,073,864 | 12/1991 | Methvin et al. | 364/715.11 |
| 5,392,406 | 2/1995 | Petersen et al. | 395/898 |
| 5,594,923 | 1/1997 | Inoue et al. | 395/886 |
| 5,594,927 | 1/1997 | Lee et al. | 395/886 |

*Primary Examiner*—Dinh C. Dung
*Attorney, Agent, or Firm*—Daniel Y. J. Kim; Frank D. Nguyen; Leon R. Turkevich

[57] ABSTRACT

A pipelined alignment shifter allows transfer of strings of bytes between memories which are non-aligned in computer systems or serial communications and networking with the memories arranged in N fields of B bits, where N and B are integers. The shifter has B copies of N−1 storage elements connected to N copies of N to 1 (N:1) multiplexers. An enable signal E is commonly transmitted to each copy of N−1 storage elements to cause each N−1 storage element, e.g., a latch or a register, to output a previously stored input and to store a corresponding input. A selection signal S indicative of the offset difference between the memories is commonly transmitted to each copy of N:1 multiplexer for realignment of non-aligned boundaries in data transfer mechanisms such as Direct Memory Access (DMA) controllers.

29 Claims, 17 Drawing Sheets

FIGURE 1A — +0 OFFSET

| | 31–24 | 23–16 | 15–8 | 7–0 |
|---|---|---|---|---|
| a | A | B | C | D |
| a+4 | E | F | G | H |
| | I | | | |

FIGURE 1B — +1 OFFSET

| | 31–24 | 23–16 | 15–8 | 7–0 |
|---|---|---|---|---|
| a | | A | B | C |
| a+4 | D | E | F | G |
| a+8 | H | I | | |

FIGURE 1C — +2 OFFSET

| | 31–24 | 23–16 | 15–8 | 7–0 |
|---|---|---|---|---|
| a | | | A | B |
| a+4 | C | D | E | F |
| a+8 | G | H | I | |

FIGURE 1D — +3 OFFSET

| | 31–24 | 23–16 | 15–8 | 7–0 |
|---|---|---|---|---|
| a | | | | A |
| a+4 | B | C | D | E |
| a+8 | F | G | H | I |

BACKGROUND ILLUSTRATION

BACKGROUND ILLUSTRATION

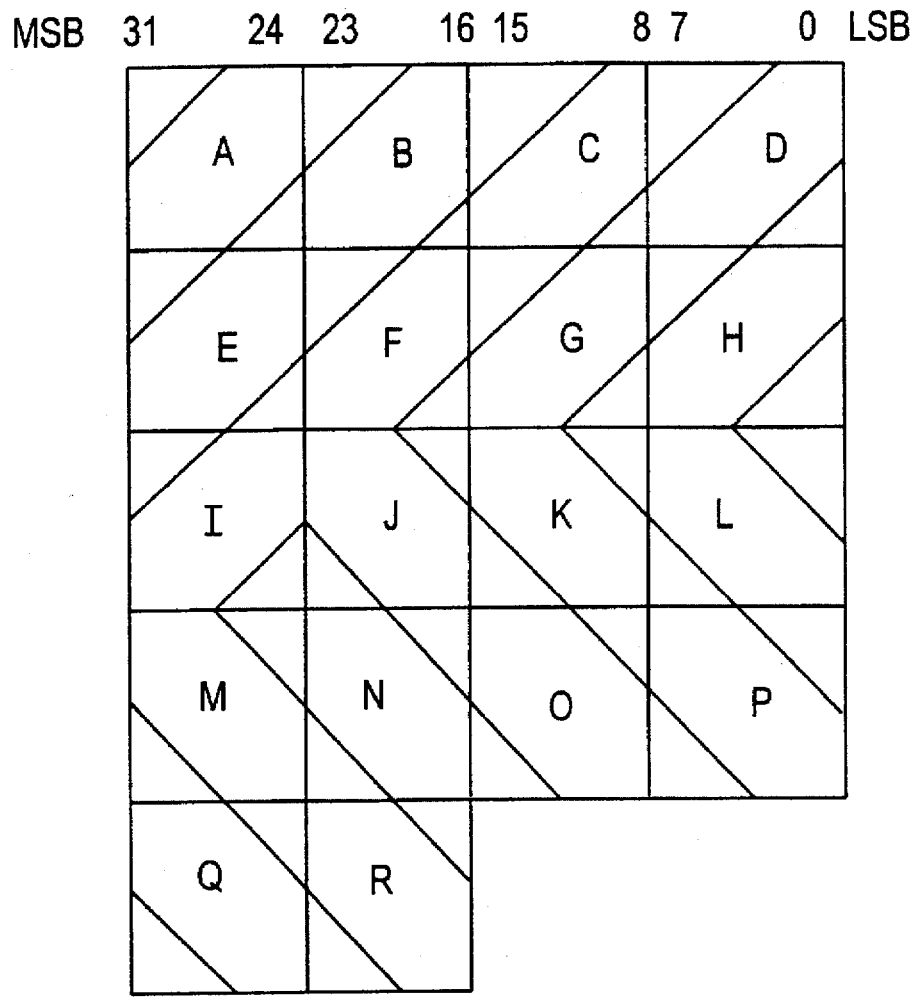
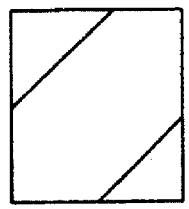
STRING 1 (A-I)
OF FIGURE 2C
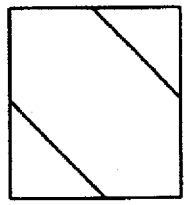
STRING 2 (J-R)
OF FIGURE 2B
FIGURE 2D
BACKGROUND ILLUSTRATION

PIPELINED ALIGNMENT SHIFTER AND METHOD FOR UNIVERSAL BIT FIELD BOUNDARY ALIGNMENT

This application is a continuation of application Ser. No. 08/362,296 filed Dec. 22, 1994 now abandoned.

TECHNICAL FIELD

The present invention relates to a circuit and method for direct memory access (DMA) controllers to move data to and from the memory of computer systems. This invention provides a simple, high performance circuit and method for overcoming problems associated with transferring data where source and destination addresses have different boundary alignments. This invention has particular application to serial communication and networking controller products where data are transferred in strings of varying lengths.

BACKGROUND ART

It is common in computer technology for the memory to be organized as large arrays of 16, 32, 64, 128, etc. bits wide. A memory word is a collection of bits, and all the bits can be generally accessed at the same time. In a big endian order, the bits can be numbered with the most significant on the left and the least significant bits on the right. For example, a 32 bit word is numbered from 31 to 0, as the bit numbers correspond to the weight of the bit, in powers of 2, when holding an integer.

Each word is divided into N uniform fields of B bits per field. The most common field size, 8 bits, is called a byte or octet. In a 32 bit word, there are four fields (N=4) of 8 bits (B=8) each. The fields are stored in memory from lower addresses continuously through higher addresses. In big endian order, the addresses of the fields in the full width word are numbered with zero on the left and increasing to the right.

Before describing prior art techniques for transferring bit fields between memories, a discussion of existing memory address nomenclature with reference to FIG. 1 is in order. When a word is stored in a memory, the word is organized into N fields of B bits, where N is the number of fields in the full field width and B is the number of bits per field. The alignment of an address "a" is defined as the remainder when the address "a" is divided by N, the number of fields in a full width memory word. For example, FIG. 1A is a graphical representation of two 32 bit words stored in a memory. Each 32 bit word is organized into four fields of bytes (A–D and E–H), where N=4 and B=8. The first word A–D is stored from a beginning memory address "a" to a final memory address "a+3", and the second word E–H is stored from a beginning memory address "a+4" to a final memory address "a+7". When the fields of bytes are stored at the beginning address, e.g., "a" or "a+4", the word is stored in the memory with a 0 boundary alignment or a 0 offset.

The fields can also be stored in the memory at different offsets. FIGS. 1B–1D are graphical representation of fields of bits snored with different offsets from the 0 boundary alignment. For example, the first word A–D is stored from a beginning memory address "a+1" to a final memory address "a+4", and the second word E–H is stored from a beginning memory address "a+5" to a final memory address "a+8" in FIG. 1B. Such storage is said to have a +1 boundary alignment or a +1 offset, since byte A is offset by one from the 0 boundary alignment, as illustrated in FIG. 1A. FIGS. 1C and 1D are illustrations of +2 and +3 offsets from the 0 boundary alignment.

When a disk controller moves a fixed block of data to and from a memory, the beginning address of the fixed block of data disk is always located at the zero offset. In other words, disks and similar devices transfer data in large uniform amounts called blocks. Blocks are generally even powers of 2 in length, i.e., 512, 1024, 4096 bytes long. They always begin at addresses which are even multiples of the number of bytes in the full width word, and this arrangement is said to be aligned. There is no misalignment of the boundaries between the disk and the memory since there are no varying lengths of data and no randomness of the beginning address. Hence, the disk controller word aligns or page aligns the block of data in the disk or memory. Computer hardware has generally been designed to optimize transfers of full words, favoring block transfers.

FIG. 2A is an illustration of a conventional computer system for transferring data between a local memory 2 of a peripheral controller 4 which includes a Direct Memory Access (DMA) controller 6 and a main memory 8a. The main memory 8a is coupled to the local memory 2 via a bus 10. I/O controllers use DMA to move data or messages of varying lengths from their local memory areas to and from the computer's main memory. A buffer is an area of memory shared by the computer and the I/O controller no exchange information, and can have the characteristics of either a block or string. A bank of the main memory is shared between the system's CPU and the peripheral controller using the system bus. The buffer in the local memory 2 can have a different boundary alignment from the buffer in the main memory 8a. For example, a 32 bit word (N=4 and B=8) may have been stored in the local memory 2 with the beginning address at the 0 offset while the buffer in the main memory 8a to receive the 32 bit word has a low memory address at the +1 offset.

Such a transfer between the local and main memories 2 and 8a is complex when neither the local and remote buffers has a 0 offset. The total number of possible combinations of boundary alignments between the local and main memory for N fields is $N^2$. To be properly transferred and stored, the fields of bytes from the source memory (the local or main memory) must be properly shifted while being transferred to place the fields at the different boundary alignment of the destination memory (the main or local memory, respectively). Unfortunately, most prior art computer systems, as discussed below, can handle only a small subset of the total combination, e.g., byte swap, word swap, etc, and cannot properly shift the bytes since the computer system prevents such transfers when the boundary alignments are different.

In one of the prior computer systems, 32 bit words are transferred in one operation cycle when the source and destination addresses have aligned boundaries. However, when the boundary alignments are non-aligned, such a computer system implements separate microcodes to transfer the 32 bit word by 8 bits or byte one at a time. Transfer by byte is time consuming and slow.

Another prior art computer system is capable of transferring one word at a time. To move the field of bytes A–D from a 0 offset of the source memory to a +1 offset of the destination memory, the CPU shafts the bytes A, B and C during the first write cycle and then writes byte D into the destination memory during the second write cycle. However, since the transfers are not pipelined, the amount of time required is doubled compared to pipelined transfers.

In a programmed input/output (I/O) operation, the CPU reads the data from the source memory and shifts the data in CPU registers. Thereafter, data are read and transferred to the destination memory. However, such transfers are time consuming, and the transfer rates are severely limited. Further, the CPU time is expended in shifting, loading and storing operations. Hardware circuitry can also be implemented for byte swap or word swap operation. Such circuitry is disadvantageous since it does not allow transfer from any starting alignment to any destination alignment.

Such situations commonly occur in data communications, where messages are similar to strings of data. A string is a sequence of bytes that can be of any length and begin on any boundary. Messages are often built up in sections, where data must be copied to a position after protocol header, and then a trailer is appended to the body of the message. Each of these components can be of varying lengths. In appending one random length string to another, great care must be taken to avoid overwriting the data at the end of the first string with the data at the beginning of the second string, if this boundary between the strings is non-aligned. Current DMA controllers are not equipped to handle the movement of non-aligned strings in an efficient manner, and prohibit such transfers.

For example, FIG. 2B shows a 9 byte string in the peripheral controllers local memory, and FIG. 2C shows the location of a string in the main memory 8a of FIG. 2A. In order to copy the string of FIG. 2B to the main memory immediately following the string of FIG. 2C, to result in a string of FIG. 2D, the DMA controller needs to adjust the position of byte J so that byte J does not overwrite byte I. And bytes K and L must be moved to avoid overwriting J, and overwriting each other. For byte M, the situation is more complex, as its proper position is no longer in the same word.

The conventional computer system prohibit such transfers. However, the present invention provides a novel shifter and method to store byte M and then combine with bytes N, O, P when the bytes are used. Further, since the same problem arises again at the end of the next word with byte Q, the present invention provides a pipelined structure. Moreover, a generic solution is provided, as there are $N^2$ combinations of local and remote boundary alignments in a memory system with N fields.

There is presently no prior art which compensates for all the combinations of boundary alignments and which is less time consuming. The present invention solves the shortcomings of the above prior art.

DISCLOSURE OF THE INVENTION

An object of this invention is to minimize the number of cycles to transfer or to copy words organized into N fields of B bits from one area of memory to another area of memory without regard to alignment, where N and B are integers.

Another object of the present invention is to compensate for all possible combinations of offset differences during transfer of N fields of B bits of data between locations.

To achieve the foregoing and other objects, and to overcome the shortcomings discussed above, a shifter for transferring N fields of B bits of data between memory locations, where N and B are positive integers, comprises a delaying means which delays the output of the fields from the source memory location to a destination memory location for a predetermined period of time, a receiving means which receives the fields of bits received from the source memory location and the delaying means, and an outputting means which outputs the fields of bits based on a selector signal indicative of offset differences between the memory locations such that all possible combinations of offset differences are compensated during transfer of N fields of B bits.

Furthermore, a pipelined alignment shifter for transferring a string of N fields of B bits between local and remote memories in serial communication and networking, where N and B are positive integers, in accordance with the present invention, comprises means for controlling transfer between the local and remote memories and the above-described shifter. The pipelined alignment shifter further includes tri-state buffers and either bidirectional registers or sample registers. The pipelined alignment shifter can be also implemented using either a shifter or back-to-back shifters.

Another aspect of the pipelined alignment shifter concerns a method of transferring or copying N fields of B bits of data from any starting boundary alignment to any destination boundary alignment, where N and B are positive integers. The method includes the inputting fields of bite into corresponding inputs of a plurality of multiplexers and a storage element. At least one field is delayed in the storage element when a selector signal indicative of a difference in boundary alignments is greater than zero, and the remaining fields are outputted through a corresponding multiplexer based upon the selector signal. Following one operation cycle, the field stored in the storage element is outputted through the other multiplexers.

BRIEF DESCRIPTION OF DRAWINGS

The invention will be described in detail with reference to the following drawings in which like reference numerals refer to like elements wherein:

FIGS. 1A–1D, previously described, are graphical representations of two 32 bit words stored in the memories having different offsets, each word comprising 4 fields of 8 bits;

FIG. 2D is an illustration of FIG. 2B string appended to the FIG. 2C string;

BEST MODE FOR CARRYING OUT THE INVENTION

Figure 2A:
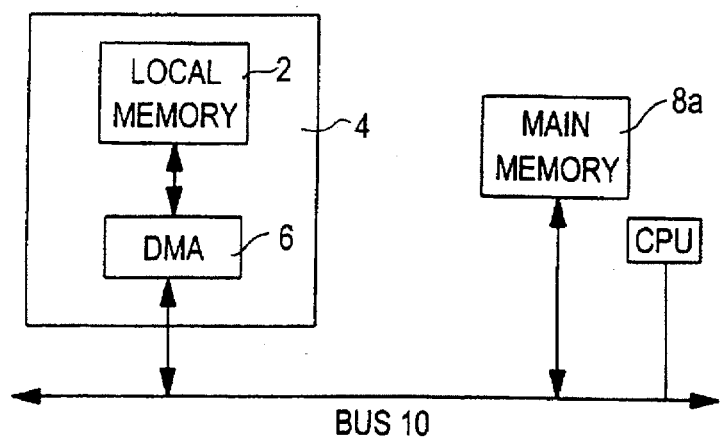
FIG. 2A is an illustration of a peripheral controller with a local memory and DMA controller in a conventional computer system.
Figure 3:
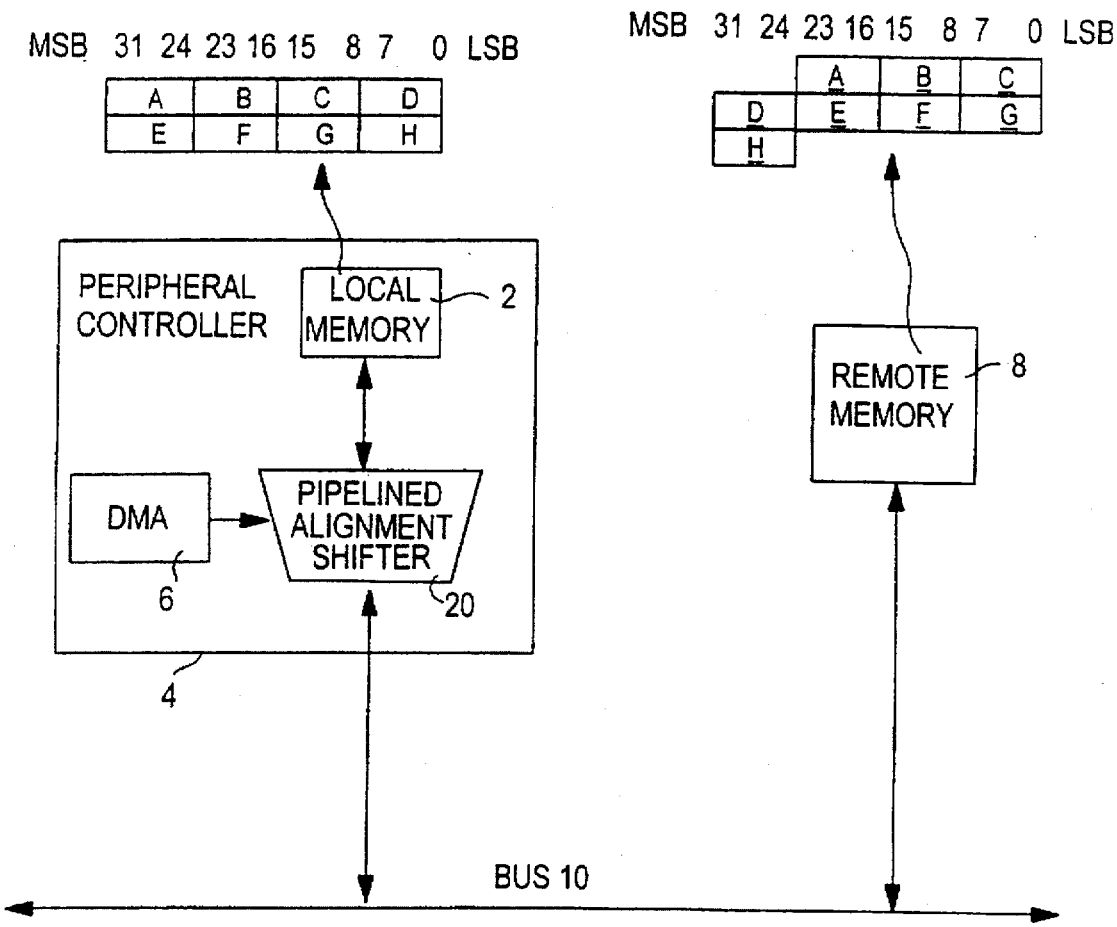
FIG. 3 is illustrative of the present invention including a pipelined alignment shifter to compensate for all offset differences between the local and remote memories.
Figure 2B:
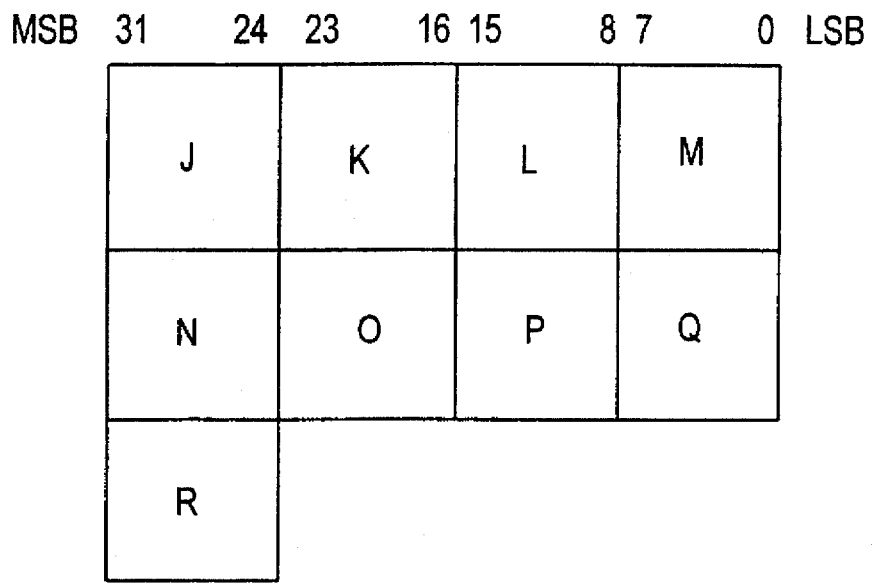
FIG. 2B is an illustration of nine byte string in a peripheral controller's local memory of FIG. 2A.
Figure 2C:
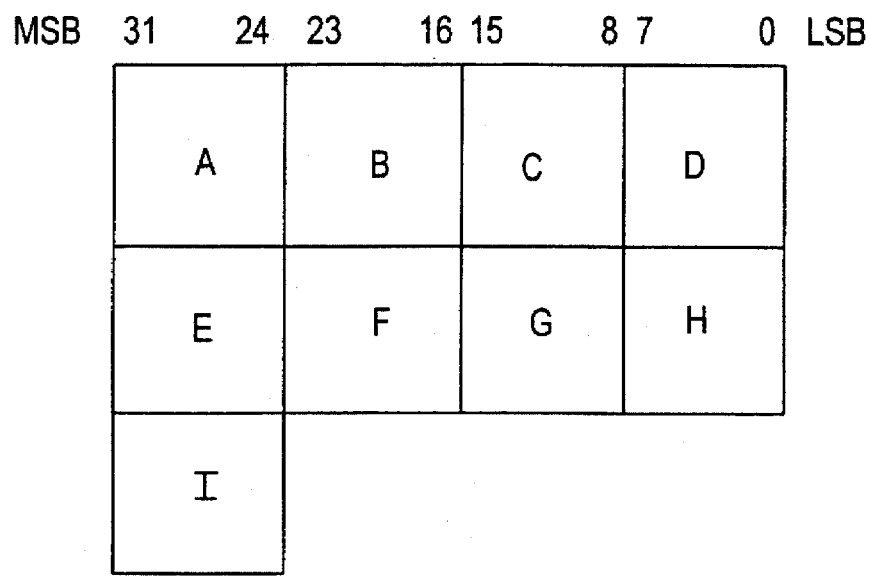
FIG. 2C is an illustration of a nine byte string stored in a main memory of FIG. 2A.
Figure 4A:
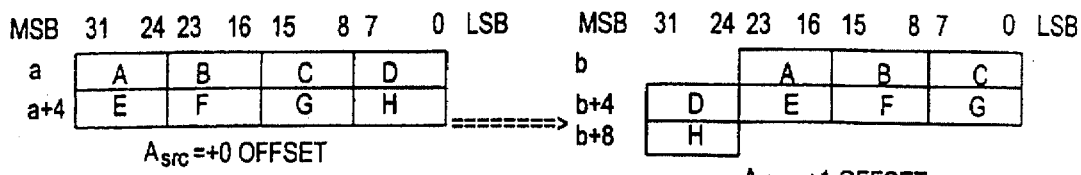
FIGS. 4A–4D are exemplary data transfers between source and destination memories having different offsets.
Figure 4B:
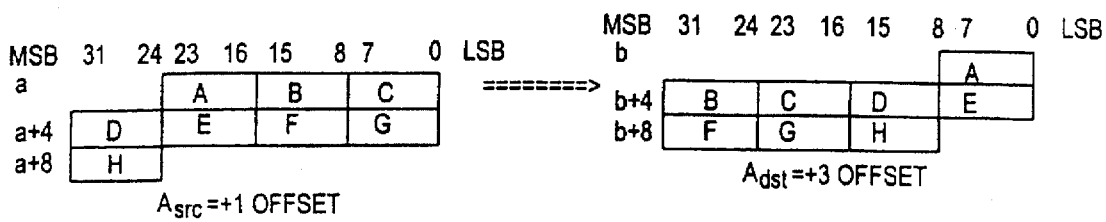
Figure 4C:
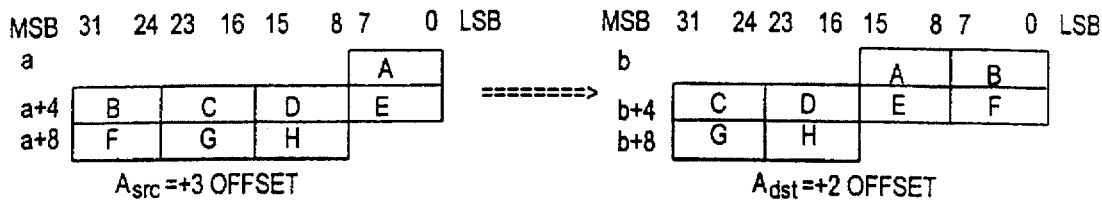
Figure 4D:
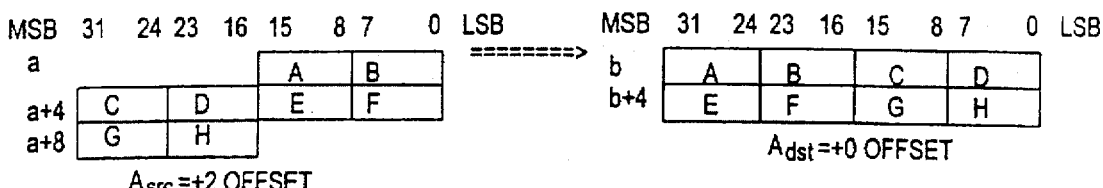

FIG. 3 is illustrative of the present invention where the peripheral controller 4 includes a pipelined alignment shifter 20. The pipelined alignment shifter 20 in conjunction with the DMA controller 6 is used to transfer the field of bits between the local memory 2 and the remote memory with different boundary alignments. The DMA controller 6 first determines the offset differences between the local and remote memories 2 and 8. Thereafter, the fields of bits are read in full field width and inputted into the pipelined alignment shifter 20 from either the local or remote memory depending on which memory is the source or destination memory. The pipelined alignment shifter 20 shifts the fields from the source memory to compensate for the offset difference, and the shifted fields are then written into the destination memory.

The present invention, for example, can transfer the two strings of 32 bit words, where each word comprises 4 fields of 8 bits, i.e., N=4 and B=8, stored in the local memory 2 with a 0 offset to the remote memory 8 with a +1 offset or vice versa, as illustrated in FIG. 3. FIGS. 4A–4D are further examples of transfers between the source and destination memories with different offsets. With the pipelined alignment shifter 20, data are transferred between the source and destination memories without regard to alignment in a minimum number of operation cycles. The pipelined alignment shifter compensates for all possible combination of boundary alignments and for strings of data with varying lengths. Hence, the pipelined alignment shifter provides universal bit field boundary alignment.

Figure 5:
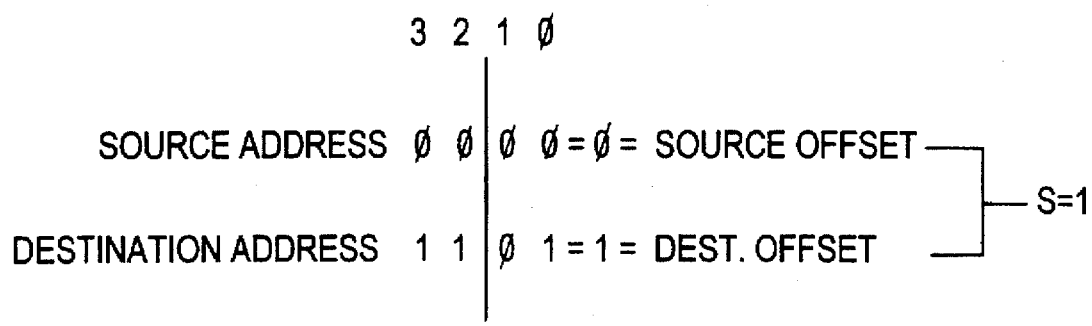
FIG. 5 is an illustration of determining a selector signal S indicative of an offset difference by a DMA controller using the Log2(N) least significant bits of the source and destination memory addresses.

To determine the offsets, the DMA controller uses the Log2(N) lower bits of the beginning of the source and destination memory addresses (see FIG. 10), where Log2(N) is rounded up to an integer. For example if N=4 Log2(4) equals 2. If the beginning address of the source memory is 0000 and the beginning address of the destination memory is 1101, the least two significant bits 0 and 0 indicate a 0 offset in the source memory, and the least significant bats 0 and 1 of the destination memory indicate a +1 offset in the destination memory, as illustrated in FIG. 5.

Based on the offsets of the source and destination memories and the number of fields, the DMA controller generates a selector signal S (see FIG. 10) to control the shifting of the fields in the pipelined alignment shifter 20 during transfer. When a destination memory offset $D_{offset}$ is greater than or equal to a source memory offset $S_{offset}$, the selector signal S equals ($D_{offset}-S_{offset}$). However, when the destination memory offset $D_{offset}$ is less than the source memory offset $S_{offset}$, the selector signal S equals ($D_{offset}-S_{offset}+N$). The values of the selector signal S range from 0 to N−1. The width of the selector signal bus from the DMA controller 6 to the pipelined alignment shifter 20 is Log2(N) bits, which is rounded up if the value is not an integer. The Log2(N) is the number of bits necessary to represent N−1 as a binary integer.

Figure 10:
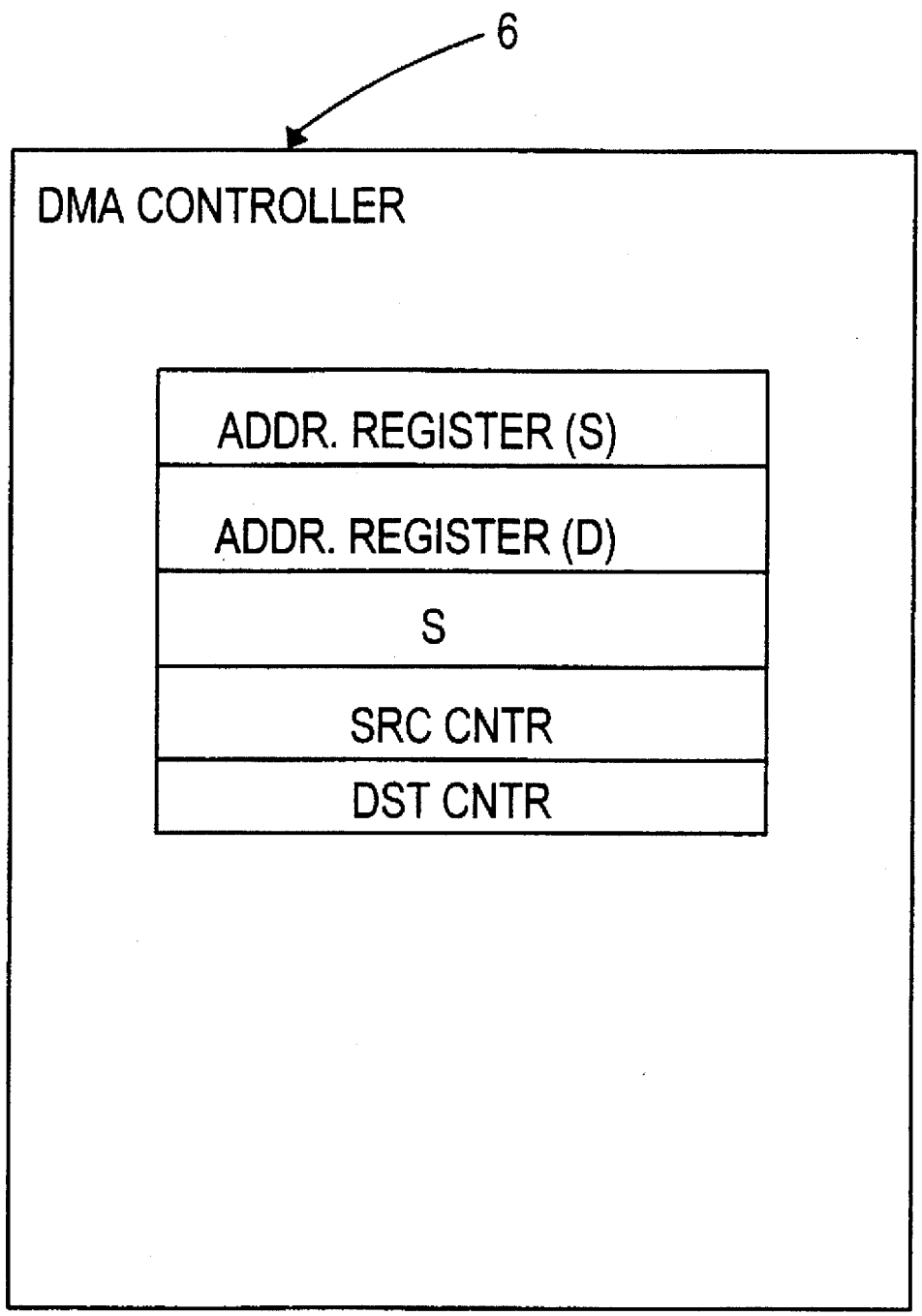
FIG. 10 is a block diagram of DMA controller of FIG. 3.

Further, the DMA controller 6 includes source and destination counters, shown in FIG. 10, which have the same initial count value indicative of the number of fields in the string of words to be transferred. Individual counters for the source and destination memories are necessary since partial words may occur at the beginning or end of either the source or destination memories. Both counters start at the same count value and end at zero, but a source count value is decremented based on valid read operations while a destination count value is decremented based on valid write operations. For any boundary combination, the number of write and read operations are equal or the number of write operations is different by one trom the number of read operations.

The pro-read operations, which occur to load the internal storage elements without a corresponding write operation, will occur whenever the destination memory offset $D_{offset}$ is less than the source memory offset $S_{offset}$. As described above, the offsets are determined based on the Log2(N) of the least significant bits of the beginning address of the source and destination addresses, where Log2(N) is rounded up if the result is not an integer.

Combinatorial logic to initiate the pre-read operations can be derived directly from the following truth table (TRUTH TABLE I), which shows whether a pre-read operation is performed based on the source and destination memory offsets and the number by which the source count is decremented (DECR-SRC) after the pre-read operations when N=4. Since Log2(4)=2, the offsets are determined by the two least significant bits of the beginning source and destination memory addresses (SRC ADDR and DST ADDR).

TRUTH TABLE I

| Least Significant Bits of: | | | |
|---|---|---|---|
| SRC ADDR | DST ADDR | PRE-READ | DEGR-SRC |
| 0 0 | 0 0 | No | 0 |
| 0 0 | 0 1 | No | 0 |
| 0 0 | 1 0 | No | 0 |
| 0 0 | 1 1 | No | 0 |
| 0 1 | 0 0 | Yes | 3 |
| 0 1 | 0 1 | No | 0 |
| 0 1 | 1 0 | No | 0 |
| 0 1 | 1 1 | No | 0 |
| 1 0 | 0 0 | Yes | 2 |
| 1 0 | 0 1 | Yes | 2 |
| 1 0 | 1 0 | No | 0 |
| 1 0 | 1 1 | No | 0 |
| 1 1 | 0 0 | Yes | 1 |
| 1 1 | 0 1 | Yes | 1 |
| 1 1 | 1 0 | Yes | 1 |
| 1 1 | 1 1 | No | 0 |

As shown, when the destination memory offset $D_{offset}$ is greater than or equal to the source memory offset $S_{offset}$, no pre-read operation is necessary. When the destination memory offset $D_{offset}$ is less than the source memory offset $S_{offset}$, a pre-read operation is performed in the first operation cycle. In other words, when some of the data needed for the first write operation is not present in the first read operation, a pipeline start up read operation is necessary.

There are two rules for writing operations: 1) a write operation at the beginning of the destination memory, and 2)

all subsequent write operations. The write operation at the beginning of the destination memory depends on the Log2(N) of the least significant bits of the addresses of the beginning of the destination memory, and the destination count, where Log2(N) is rounded up to an integer. All subsequent write operations depend only on the number of fields remaining in the count.

Bit field valid signals are necessary to avoid overwriting the fields already in the memory when writing a partial word. The bit field valid signals can be derived from the destination count and the least significant bits of the destination address, as described in the rules above. If the count for writing is greater than or equal to N, then all the fields of bits are valid. If the count for writing is less than N, then the number of fields in the count, starting from the most significant field, is valid. Bit field valid signals are not necessary for reading since all the read operation are performed in full width, and the read operations are non-destructive, i.e., nothing in the memory is destroyed by reading extra data.

The rules for write operations are described in the following Charts I and II. Since Log2(4)=2, the two least significant bits of the beginning destination memory address and the destination count (dst count, where ">=" means that the destination count is greater than or equal to the number shown) determine which fields ($N_3$–$N_0$, where $N_3$ is the most significant field and $N_0$ is the least significant field) are valid for the write operations and determine how to decrement the destination counter. Chart I is instructive in illustrating the rule for the first write operation. The starting position for the beginning of a string is determined by the offset of the beginning address of the destination buffer. The fields are written in order through the end of the word, unless the destination count is less than the number of fields remaining in the word. The destination counter is decremented by one for each valid field written, and the counter can be decremented up to N in each decrement operation.

CHART I: FIRST WRITE

| 2 lsbs | dst count | Valid fields | decrement dst counter by |
|--------|-----------|--------------|--------------------------|
| 00 | >=4 | $N_3, N_2, N_1, N_0$ | 4 |
| 00 | 3 | $N_3, N_2, N_1$ | 3 |
| 00 | 2 | $N_3, N_2$ | 2 |
| 00 | 1 | $N_3$ | 1 |
| 01 | >=3 | $N_2, N_1, N_0$ | 3 |
| 01 | 2 | $N_2, N_1$ | 2 |
| 01 | 1 | $N_2$ | 1 |
| 10 | >=2 | $N_1, N_0$ | 2 |
| 10 | 1 | $N_1$ | 1 |
| 11 | >=1 | $N_0$ | 1 |

Chart II is instructive in illustrating the rule for all subsequent writes. Chart II is simpler than Chart I because all writes after the first write are word aligned. Subsequent writes all begin filling locations at the zero offset position and continue through the end of the word until the destination counter reaches zero. Most of the words in a string to form a message, those in the middle, will be full word width, and the last write may be partial, with less than N fields valid.

CHART II: SUBSEQUENT WRITES

| dst count | Valid fields | decrement dst counter by |
|-----------|--------------|--------------------------|
| >=4 | $N_3, N_2, N_1, N_0$ | 4 |
| 3 | $N_3, N_2, N_1$ | 3 |
| 2 | $N_3, N_2$ | 2 |
| 1 | $N_3$ | 1 |

Figure 6A:
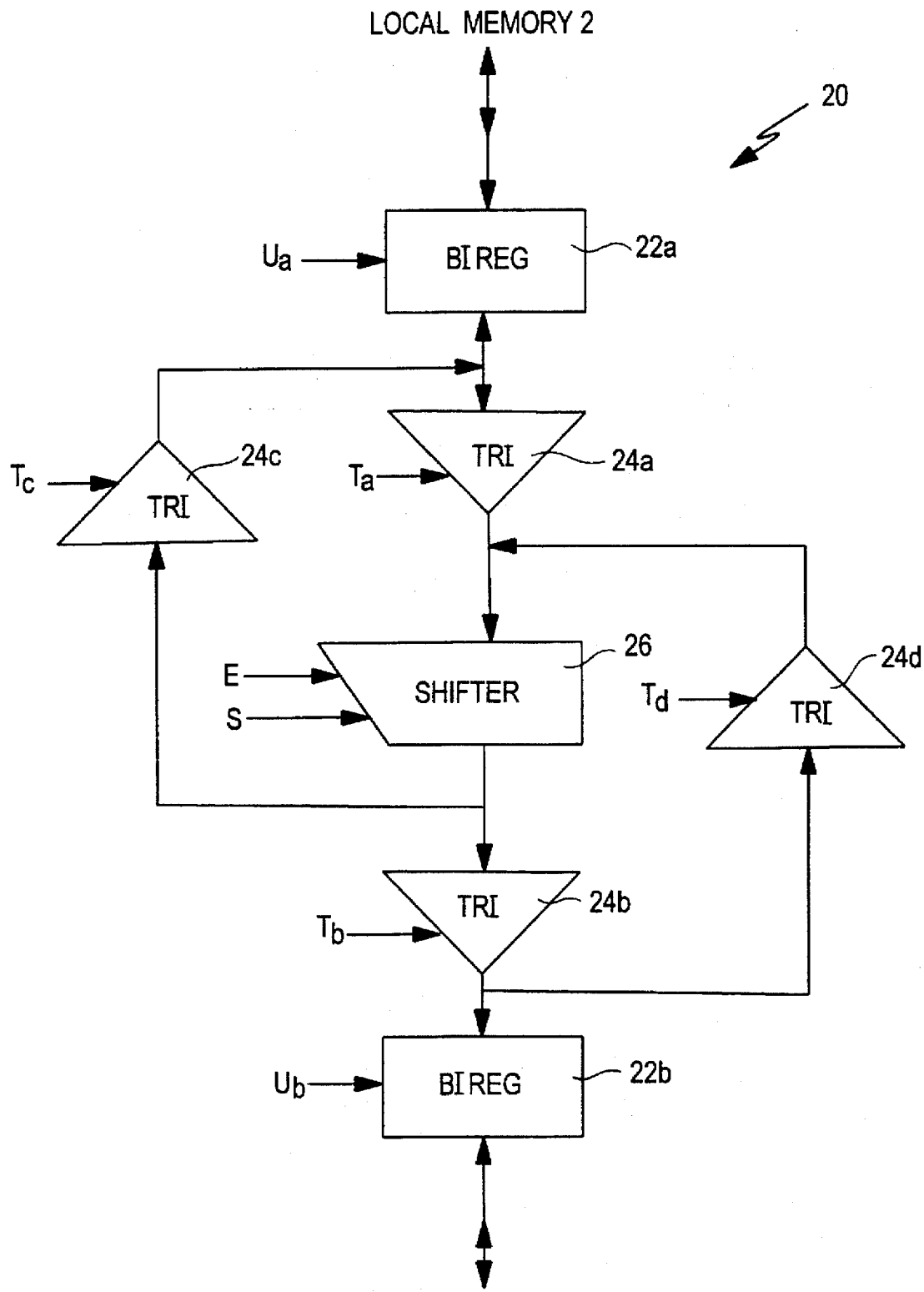
FIGS. 6A–6D are illustrations of different embodiments of the pipelined alignment shifter illustrated in FIG. 3.

FIG. 6A is a block diagram of a first embodiment of the pipelined alignment shifter 20 of FIG. 3. The pipelined alignment shifter 20 includes bidirectional registers 22a and 22b, tri-state buffers 24a, 24b, 24c and 24d and a shifter 26. The signals Ta, Tb, Tc and Td turn on or off the tri-state buffers 24a, 24b, 24c and 24d, respectively, and enable signals Ua and Ub control the bidirectional registers 22a and 22b, respectively.

An enable signal E is applied to control the storage elements (described hereinafter) of the shifter 26. The enable signal E is synchronous with the enable signals Ua and Ub for the bidirectional registers. In other words, the timing of the enable signal E cooperates with the timing of the enable signals Ua and Ub such that data in the bidirectional registers 22a and 22b and the shifter 26 are stable simultaneously. The signals Ta, Tb, Tc, Td, Ua, Ub and E are generated by the DMA controller 6. As can be appreciated, such signals can be generated by a separate control timing circuit.

When the fields are transferred from the local memory 2 of the peripheral controller 4 to the remote memory 8, the bidirectional registers 22a and 22b and the buffers 24a and 24b are turned on such that the fields flow through the bidirectional register 22a, the tri-state buffer 24a, the shifter 26, the tri-state buffer 24b and the bidirectional register 22b. When data is transferred from the remote memory 8 to the local memory 2, the bidirectional registers 22a and 22b and the tri-state buffers 24c and 24d are turned on while the buffers 24a and 24b are turned off. Hence, the fields flow through the bidirectional register 22b, the tri-state buffer 24d, shifter 26, tri-state buffer 24c and the bidirectional register 22a. The pipelined alignment shifter 20 is bidirectional for transfer of fields of bits.

Figure 6B:
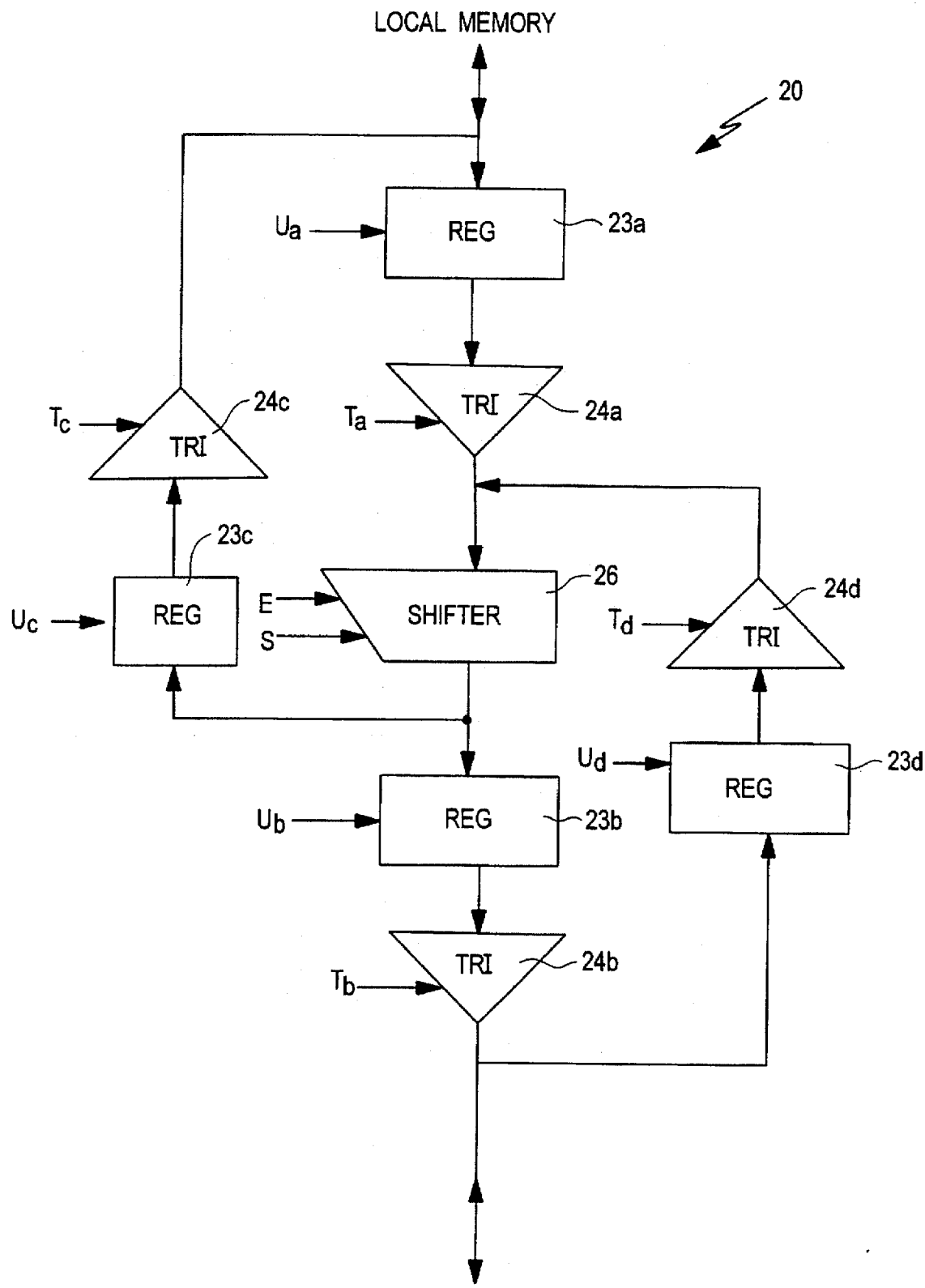

FIG. 6B is illustrative of a second embodiment of the present invention. FIG. 6B embodiment is similar to the first embodiment of FIG. 6A, but rather than using the bidirectional registers 22a and 22b, the FIG. 6B embodiment pipelined alignment shifter 20 includes simple registers 23a, 23b, 23c and 23d. The signals Ua, Ub, Uc and Ud and Ta, Tb, Tc, and Td control the simple registers 23a, 23b, 23c and 23d and tri-buffers 24a, 24b, 24c and 24d, respectively. When the fields are transferred from the local memory 2 to the remote memory 8, the appropriate tri-state buffers and simple registers are enabled and disabled such that the fields flow through the simple register 23a, tri-state buffer 24a, shifter 26, simple register 23b and tri-state buffer 24b. When the fields are transferred from the remote memory 8 to the local memory 2, the fields flow through the simple register 23d, tri-state buffer 24d, shifter 26, simple register 23c and tri-state buffer 24c.

Figure 6C:
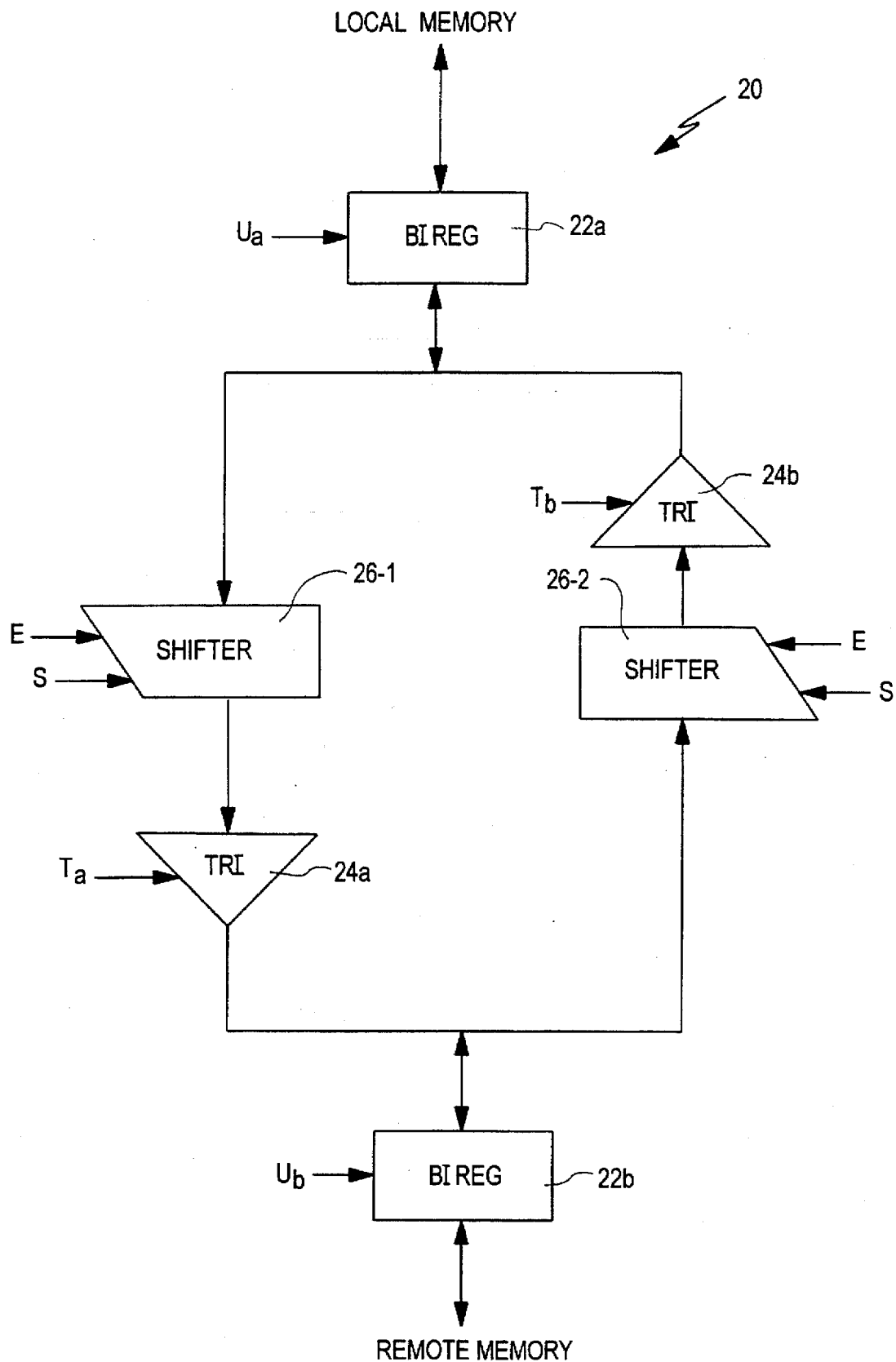

FIG. 6C is a block diagram of another embodiment of the pipelined alignment shifter 20 including back-to-back shifters 26-1 and 26-2 with bidirectional registers 22a and 22b. When the fields are transferred from the local memory 2 to the remote memory 8, the fields flow through the bidirectional register 22a, shifter 26-1 tri-state buffer 24a and bidirectional register 22b. When the fields are transferred from the remote memory 8 to the local memory 2, the fields flow through the bidirectional register 22b, shifter 26-2, tri-state buffer 24b and bidirectional register 22a.

Figure 6D:
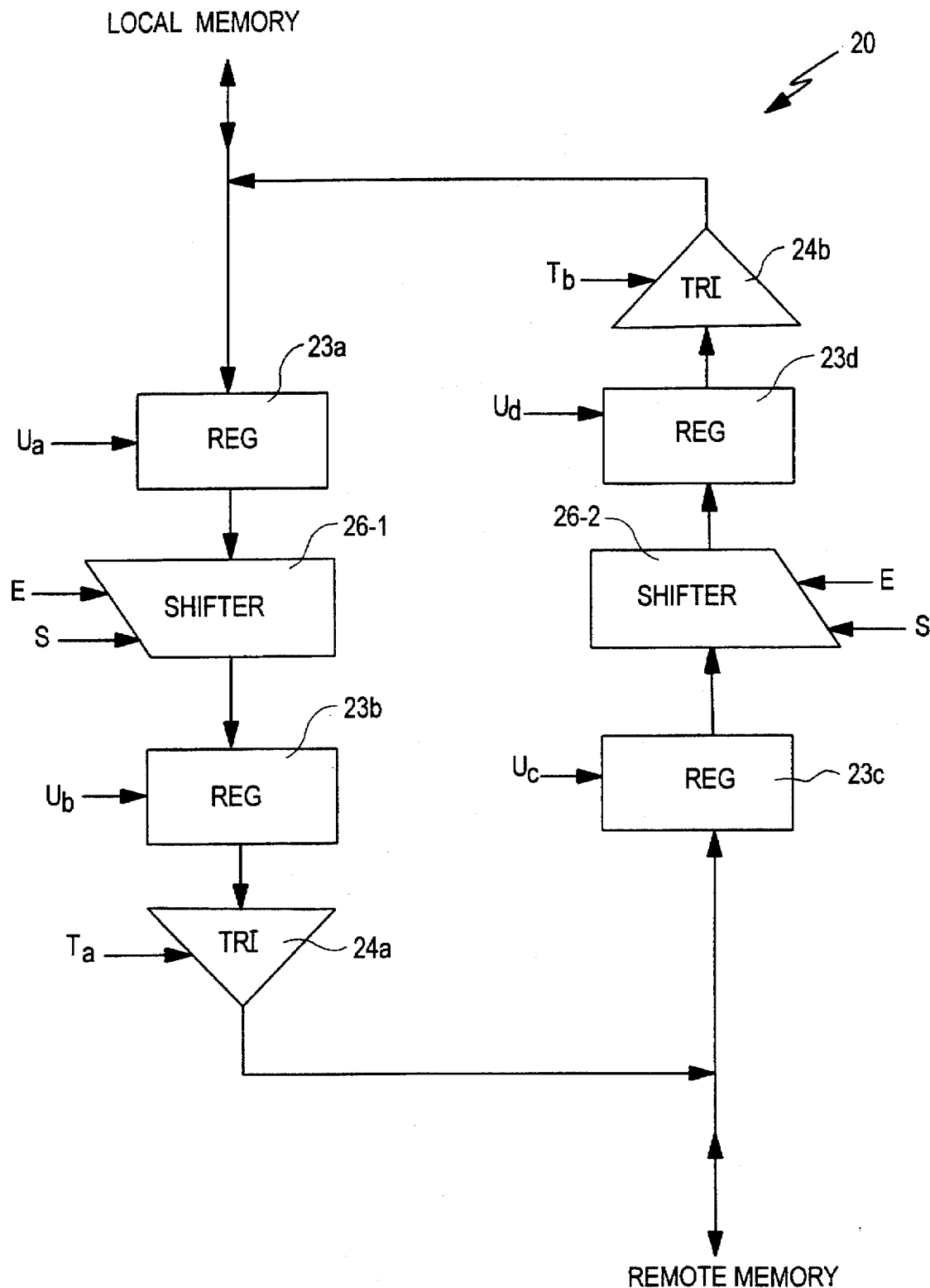

FIG. 6D is an illustration of a fourth embodiment of the pipelined alignment shifter 20 including back-to-back shifters 26-1 and 26-2 with simple registers 23a, 23b, 23c and 23d. When the fields are transferred from the local memory 2 to the remote memory 8, the fields flows through the simple register 23a, shifter 26-1, register 23b and trustate buffer 24a. When the fields are transferred from the remote memory 8 to the local memory 2, the fields flow through the simple register 23c, shifter 26-2, simple register 23d and tri-state buffer 24b.

As shown in FIGS. 6A through 6D, the selector signal S is applied to the shifter 26, which is responsible for shifting of the fields during transfer to compensate for the offset differences between the local and remote memories. The shifter 26, 26-1 or 26-2 contains B copies of N−1 storage elements which are connected to N copies of N to 1 multiplexers, which allows the realignment of non-aligned boundaries in a data transfer mechanisms such as a Direct Memory Access (DMA) controller. An enable signal E is commonly transmitted to N−1 storage elements to cause each N−1 storage element, e.g., a latch or a register, to store a corresponding input and output that value. Otherwise, the outputs of the shifter could become unstable. The select signal S is commonly transmitted to all the N:1 multiplexers. FIGS. 7A–8A are useful in describing the principles of the shifter which is scalable such that it can be expanded as the number of fields N increases and modular such that it can be easily modified to handle larger number of bits B per field.

Figure 7A:
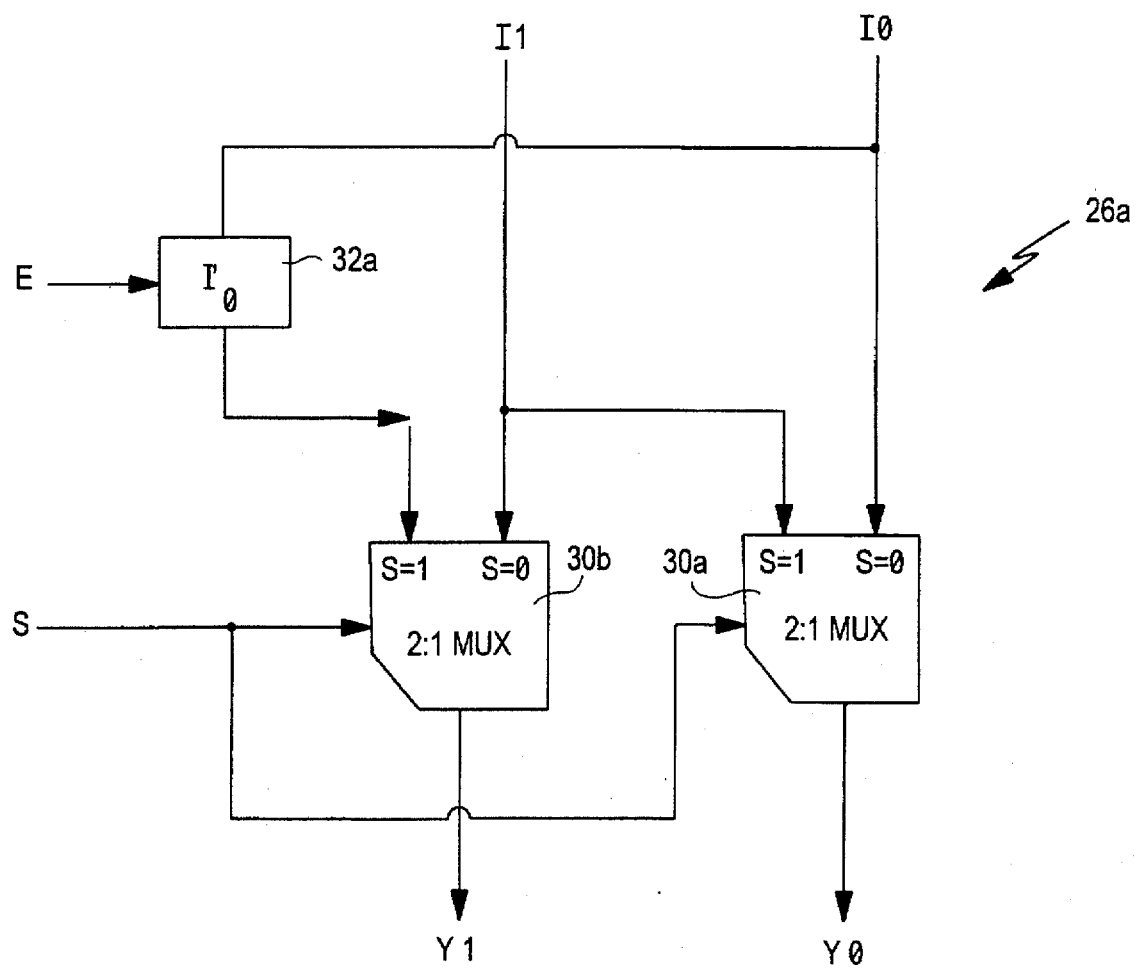
FIG. 7A is a block diagram of the shifter when the number of fields N equals 2 and the number of bits B equals 1.

In FIG. 7A, a shifter 26a comprises two 2:1 multiplexers 30a and 30b and one storage element 32a when N=2 and B=1. Each input, $I_0$ to $I_{N-1}$ (hereinafter, collectively referred to as I), is a B bit wide input of a field, and each output, $Y_0$ to $Y_{N-1}$ (hereinafter, collectively referred to as Y), is a B bit wide output from the 2:1 multiplexers. The data $\Gamma_0$ is the input $I_0$ stored in the memory element 8a for one operation cycle, where an operation cycle is a cycle of the enable signal E, usually defined as the period of time to simultaneously perform read and write operations by the computer system. The operation of the shifter 26a is shown in the following Multiplexer Selection Table with the outputs $Y_1$ and $Y_0$ expressed as a function of the stored data $\Gamma_0$, inputs $I_1$ and $I_0$ and selector signal S:

TABLE 1

| Multiplexer Selection | |
|---|---|
| S = 0 | S = 1 |
| $Y_0 = I_0$ | $Y_0 = I_1$ |
| $Y_1 = I_1$ | $Y_1 = I_0$ |

When operating the FIG. 7A shifter, the input $I_1$ is first provided as output $Y_1$ and then after one operation cycle, the stored input $\Gamma_0$ is provided as output $Y_1$ there is an offset difference of one between the source and destination memories. Hence, the output Y can be shifted by one with respect to the input I to compensate for the offset difference of one between the source and destination memories.

Figure 7B:
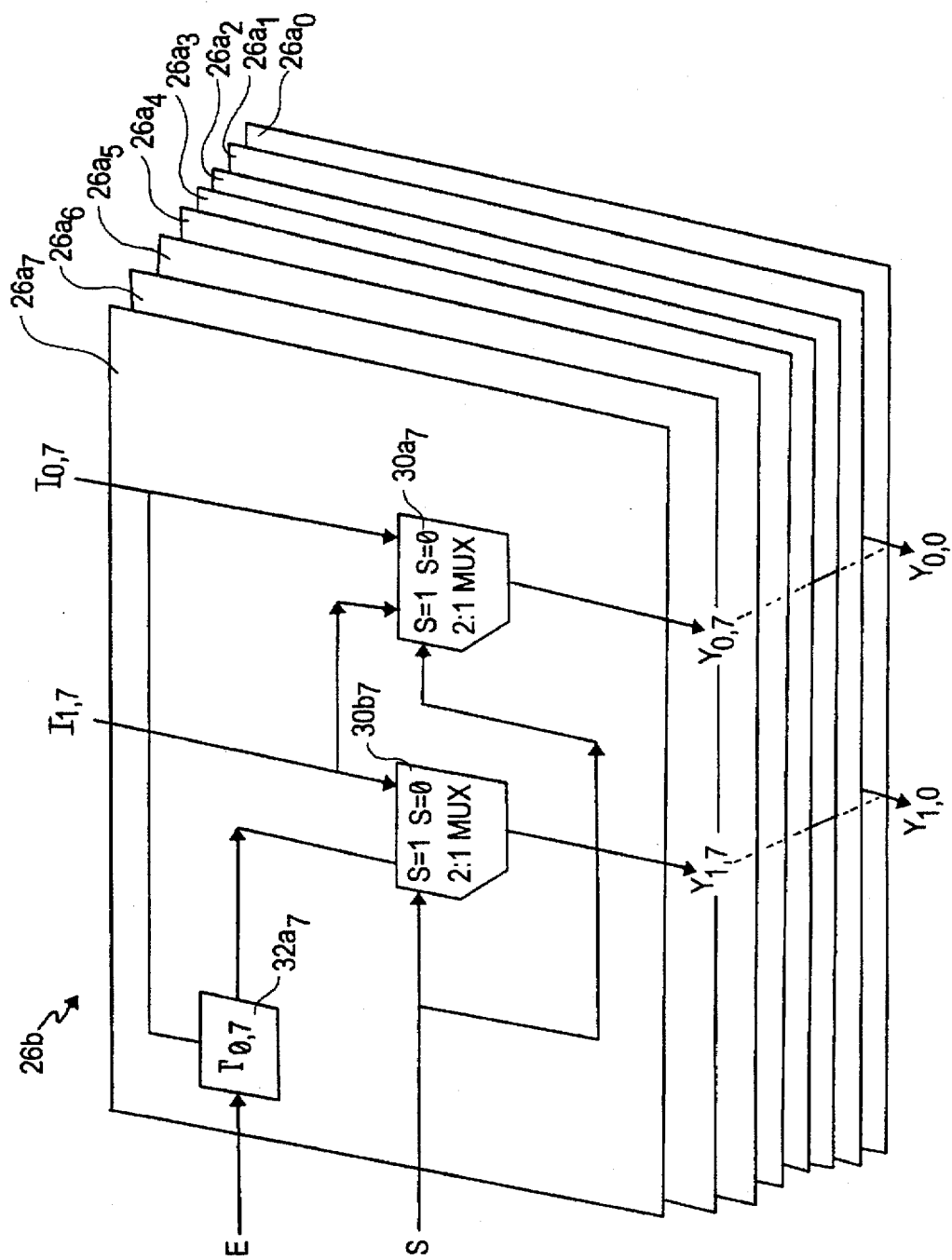
FIG. 7B is a block diagram of the shifter when the number of fields N equals 2 and the number of bits equals 8.

FIG. 7B is an illustration of the shifter 26b in the two fields (N=2) of bytes (B=8) configuration. The FIG. 7B shifter 26b comprises 8 copies (B copies) of the shifter $26a_7$–$26a_0$ of FIG. 7A stacked on top of one another, each shifter 26a having a storage element ($32a_7 \ldots 32a_0$) and two 2:1 multiplexers ($30a_7 \ldots 30a_0$) and ($30b_7 \ldots 30b_0$). The enable signal E and the selector siqnal S are commonly connected to all B copies, but since there are no other interconnections between the 8 copies of the shifters $26a_7$–$26b_0$, the inputs $I_{1,7} \ldots I_{1,0}$ ($I_{1,[7:0]}$) and $I_{0,7} \ldots I_{0,0}$ ($I_{0,[7:0]}$), the stored fields $\Gamma_{0,7} \ldots \Gamma_{0,0}$ ($\Gamma_{1,[7:0]}$) and the outputs $Y_{1,7} \ldots Y_{1,0}$ ($Y_{1,[7:0]}$) in each bit position are independent from corresponding signals in other bit positions. The subscripts [7:0] refer to the bit position in the corresponding copy or the shifters $26a_7$–$26a_0$.

Combinatorial logic to initiate the pre-read operation can be derived directly from the following TRUTH TABLE II, which also shows the number by which the source count will be decremented (DECR-SRC) after the pre-read operation. Since Log2(2)=1, the offsets are determined by the least significant bit of the beginning source and destination addresses (SRC ADDR and DST ADDR).

TRUTH TABLE II

| Least Significant Bits of: | | | |
|---|---|---|---|
| SRC ADDR | DST ADDR | PRE-READ | DECR-SRC |
| 0 | 0 | No | 0 |
| 0 | 1 | No | 0 |
| 1 | 0 | Yes | 1 |
| 1 | 1 | No | 0 |

As illustrated in the following CHART III, the write operation at the beginning of the destination memory depends on one (Log2(2)=1) least significant bit (1 lsb) and the destination count. The valid fields indicate which field is valid for the write operation, and the destination counter is decremented based on the valid fields. Further, all subsequent write operations depend on the number of fields remaining in the count, as illustrated in CHART IV.

| CHART III: FIRST WRITE | | | |
|---|---|---|---|
| lsb | count | Fields valid | decrement dst counter by |
| 0 | >=2 | $N_1$, $N_0$ | 2 |
| 0 | 1 | $N_1$ | 1 |
| 1 | 1 | $N_0$ | 1 |

| CHART IV: SUBSEQUENT WRITES | | |
|---|---|---|
| DEST COUNT | Fields valid | decrement dst counter by |
| >=2 | $N_1$, $N_0$ | 2 |
| 1 | $N_1$ | 1 |

Figure 7C:
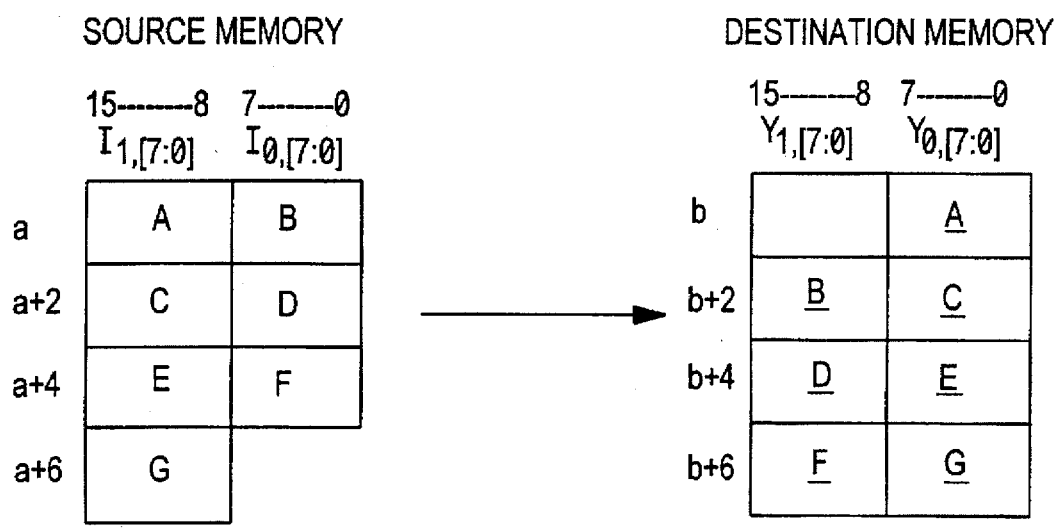
FIG. 7C is a graphical representation of a seven byte transfer between a source memory with a 0 offset and a destination memory with a +1 offset.

FIG. 7C is a graphical representation of a seven byte transfer between a source buffer with a 0 offset and a destination buffer with a +1 offset when N=2 and B=8. The selector signal S=1 since the offset difference between the destination and source memories is 1. Further, the transfer count equals 7, which is indicative, of the number of fields to be transferred. The following illustrates the operation of the shifter 26b for transferring and storing the seven fields:

Pipelined Operation Table I

| | READ | | | WRITE | | | |
|---|---|---|---|---|---|---|---|
| OP # | $I_1$ | $I_0$ | SRC CNTR | STORE $I_0'$ | VALD $N_1 N_0$ | $Y_1$ | $Y_0$ | DST CNTR |
| START | | | 7 | | | | | 7 |
| 1 | A | B | 5 | 8 | V | | <u>A</u> | 6 |
| 2 | C | D | 3 | D | W | <u>B</u> | <u>C</u> | 4 |
| 3 | E | F | 1 | F | W | <u>D</u> | <u>E</u> | 2 |
| 4 | | G | 0 | | W | <u>F</u> | <u>G</u> | 0 |

Pipelined Operation Table II

| | READ | | | WRITE | | | |
|---|---|---|---|---|---|---|---|
| OP # | $I_1$ | $I_0$ | SRC CNTR | STORE $I_0'$ | VALD $N_1 N_0$ | $Y_1$ | $Y_0$ | DST CNTR |
| START | | | 5 | | | | | 5 |
| 1 | | A | 4 | A | | | | 5 |
| 2 | B | C | 2 | C | W | | <u>A</u> | 3 |
| 3 | D | E | 0 | E | W | <u>B</u> | <u>C</u> | <u>D</u> | 1 |
| 4 | | | 0 | | V | | <u>E</u> | 0 |

The read, write, store and counting operations occur simultaneously within each operation cycle. The byte labels in the destination memory is underlined for differentation from the byte labels in the source memory. The source counter (SRC CNTR) is decremented based on the number of fields read and the destination counter (DST CNTR) is decremented based on valid field signals (VALD) for the writing operations, where "." indicates a non-valid field and "V" indicates a valid field.

During the first operation cycle, bytes A and B are read and are provided as the inputs $I_{1,[7:0]}$ and $I_{0,[7:0]}$, respectively. The multiplexers $30a_{[7:0]}$ provide byte A as the output $Y_{0,[7:0]}$ for writing into the destination memory at the address "b+1". Meanwhile, each bit of byte B is stored in the corresponding storage element $32a_{[7:0]}$, and the count is decremented by one based on the valid write operation of byte A in the destination memory.

During the second operation cycle, bytes C and D are read and are provided, respectively, to the input terminal $I_{1,[7:0]}$ and $I_{0,[7:0]}$. The storage elements $32a_{[7:0]}$ send the stored bits of byte B ($T_{0,[7:0]}$) to the multiplexers $30b_{[7:0]}$ to be provided as the output $Y_{1,[7:0]}$, and byte B is written into the destination memory at the address "b+2".

Byte C at the input $I_{1,[7:0]}$ are sent through the multiplexers $30a_{[7:0]}$ to the outputs $Y_{0,[7:0]}$, and byte C is written into the destination memory at the address "b+3". Each bit of byte D is stored in the corresponding storage element $32a_{[7:0]}$, and the count is decremented by two based on the two valid write operation of bytes B and C. The same read, write, store and counting operations are performed for bytes E (E), F (F) and G (G) in the third and fourth operation cycles until the count is decremented to zero.

When the destination memory offset $D_{offset}$ is greater than or equal to the source memory offset $S_{offset}$, the selector signal S equals ($D_{offset}-S_{offset}$). For example, in FIG. 7C transfer, the selector signal S equals one ($D_{offset}-S_{offset}$=1−0=1). Further, a write operation is performed in the first operation cycle, and all the data needed for the writing operation is picked up in the first read operation. The residual data not used in the first write operation are saved in the storage elements for use in the second write operation.

Figure 7D:
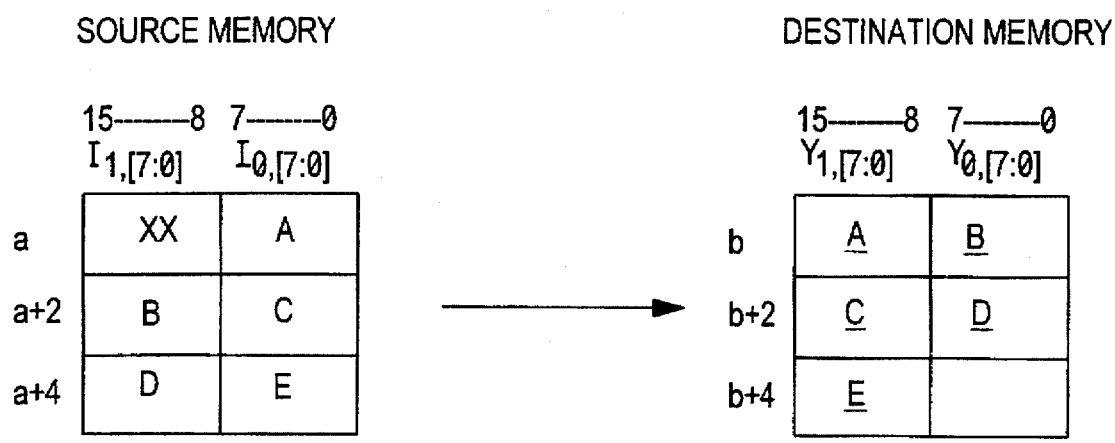
FIG. 7D is a graphical representation of a five byte transfer between a source memory with a +1 offset and a destination memory with a 0 offset.

FIG. 7D is a graphical illustration of a five byte transfer when the destination memory offset $D_{offset}$ is less than the source memory offset $S_{offset}$. As shown, the source memory has a +1 offset, and the destination memory has a 0 offset. Hence, the selector signal S equals one ($D_{offset}-S_{offset}+N$= 0−1+2=1). The transfer count equals 5. The following Pipelined Operation Table II illustrates the FIG. 7D transfer:

During the first operation cycle a pipelined-start-up read operation is necessary since bytes A and B cannot be written together until byte B is fetched in the source word following byte A. The read bits of byte A at the input $I_0$ are stored in the storage elements $32a_{[7:0]}$. Further, no writing operation is performed, and the destination count value remains at 5.

During the second operation cycle, bytes B and C are read and are provided to the inputs $I_{1,[7:0]}$ and $I_{0,[7:0]}$. The storage elements $32a_{[7:0]}$ provide the stored bits of byte A ($T_{0,[7:0]}$) to the multiplexers $30b_{[7:0]}$ which provide the outputs $Y_{1,[7:0]}$. Byte A is written into the destination memory at the address "b". Byte B at the inputs $I_{1,[7:0]}$ is sent through the multiplexers $30a_{[7:0]}$ as outputs $Y_{0,[7:0]}$, and is written in the destination address "b+1". Hence, the source and destination counts are decremented by two based on the read operation of bytes B and C and the write operation of bytes A and B. The same read, write, store and counting operations are performed for reading bytes D and E and writing bytes C and D in the third operation cycle.

In the fourth operation cycle, no read operation is performed since all the data has been read. However, the bits of byte E wrere previously stored in the storage elements $32a_{[7:0]}$ during the third operation cycle. The bits of byte E are written into the destination memory "b+4", and the destination count is decremented by one to zero based on this write operation of byte E.

The shifter 26a is scalable to accommodate the increase in number of fields, such as when N equals 4. The shifter 26c includes four 4:1 multiplexors 34a, 34b, 34c and 34d and three storage elements 32a, 32b and 32c, as illustrated in FIG. 8A, Likewise, the function of the four field shifter 26c can be expressed in the following Multiplexer Selection Table 2:

TABLE 2

| Multiplexer Selection | | | |
|---|---|---|---|
| S = 0 | S = 1 | S = 2 | S = 3 |
| $Y_0 = I_0$ | $Y_0 = I_1$ | $Y_0 = I_2$ | $Y_0 = I_3$ |
| $Y_1 = I_1$ | $Y_1 = I_2$ | $Y_1 = I_3$ | $Y_1 = T_0$ |
| $Y_2 = I_2$ | $Y_2 = I_3$ | $Y_2 = T_0$ | $Y_2 = T_1$ |
| $Y_3 = I_3$ | $Y_3 = T_0$ | $Y_3 = T_1$ | $Y_3 = T_2$ |

Figure 8A:
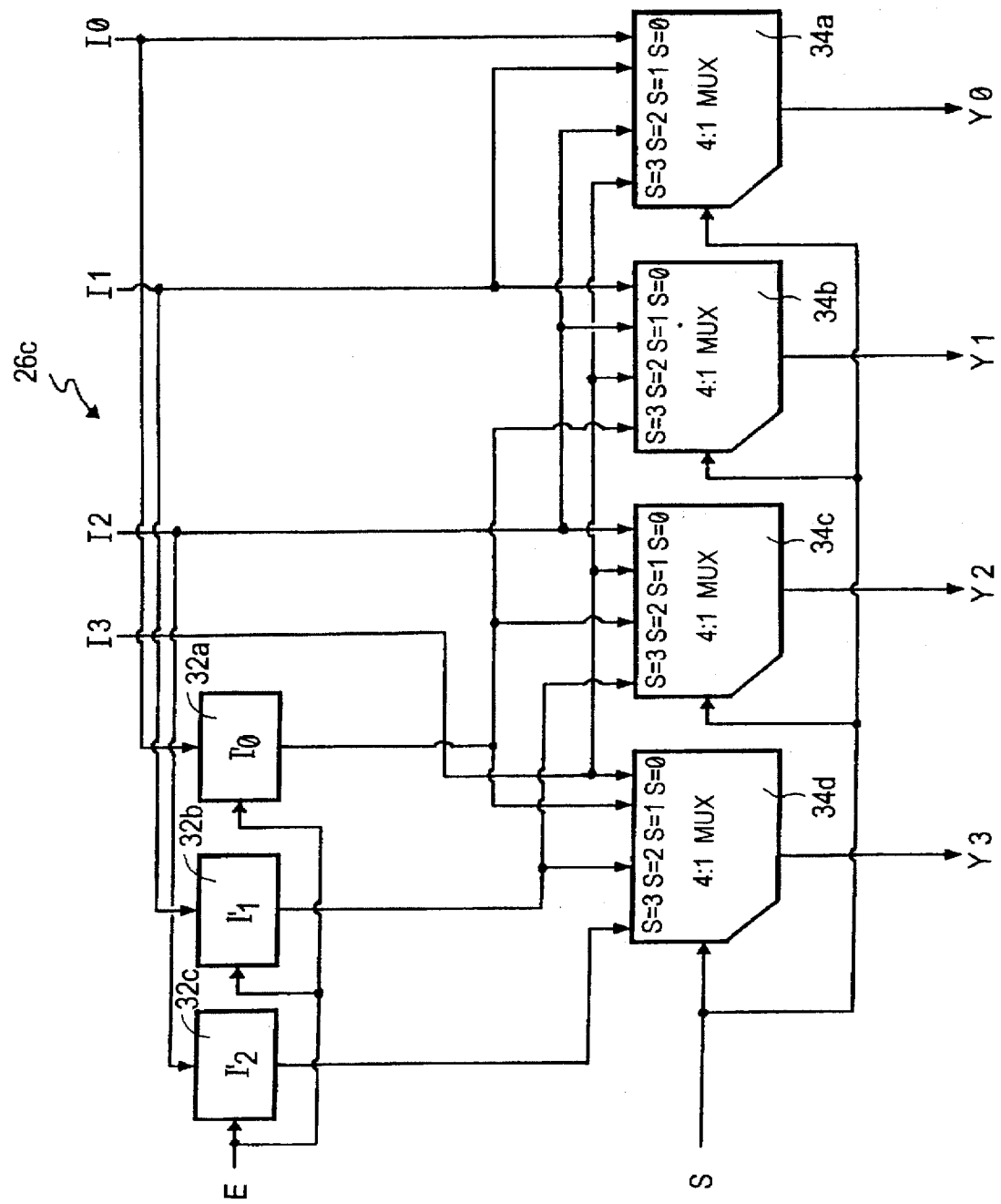
FIG. 8A is a block diagram of the shifter when the number of fields N equals 4 and the number of bits B equals 1.

When operating the FIG. 8A shifter, the inputs $I_1$, $I_2$ and $I_3$ are first provided as output $Y_0$, $Y_1$ and $Y_2$, respectively, and then after one operation cycle, the stored input $T_0$ is provided as the output $Y_3$ if there is an offset difference of one between the source and destination memories (S=1). As can be appreciated, the outputs Y can be shifted by one with respect to the inputs I to compensate for the offset difference of one between the source and destination memories.

When there is an offset difference of two between the source and destination memories (S=2), the inputs $I_0$ and $I_1$ are stored in the storage elements 32a and 32b, respectively, for one operation cycle while the inputs $I_2$ and $I_3$ are provided as the outputs $Y_0$ and $Y_1$, respectively. Thereafter, the stored inputs $I'_0$ and $I'_1$ are provided as the outputs $Y_2$ and $Y_3$, respectively. Hence, the outputs Y can be shifted by two with respect to the inputs I.

Further, the four field shifter 26c stores the inputs $I_0$, $I_1$ and $I_2$ in the storage elements 32a, 32b and 32c, respectively, when the selector signal S indicates an offset difference of three between the source and destination memories (S=3). After the input $I_3$ is provided as the output $Y_3$, during the previous operation cycle, the stored inputs $I'_0$, $I'_1$ and $I'_2$ are provided as outputs $Y_1$, $Y_2$ and $Y_3$, respectively. Hence, the outputs Y can be shifted by three with respect to the inputs I.

Figures 8B, 8C, 8D:
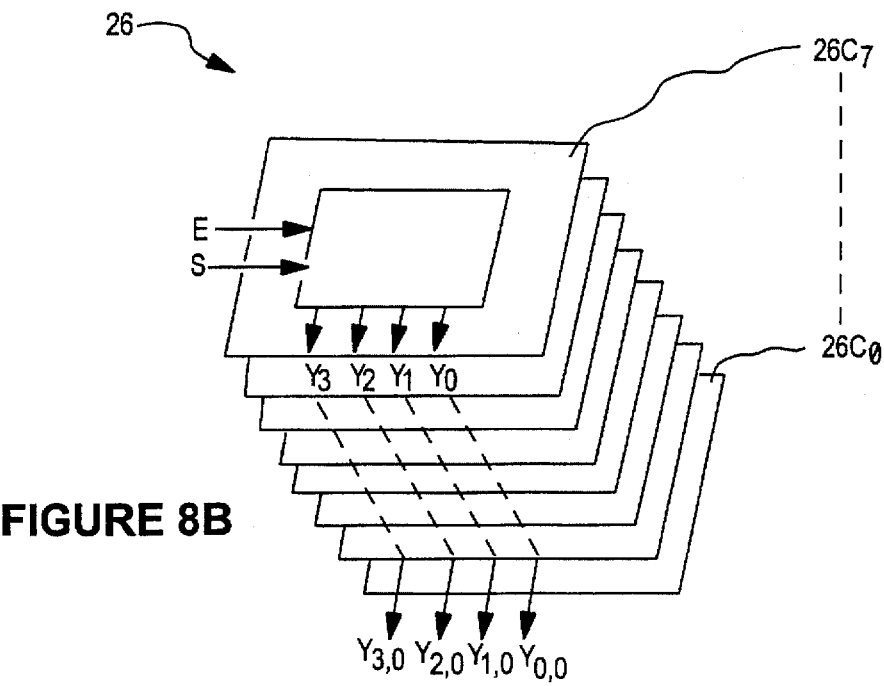
FIG. 8B is a block diagram of FIG. 6A–6D shifter, when the number of fields N equals 4 and the number of bits B equals 8.
FIG. 8C is a graphical representation of how two 32 bit word transfer between a source memory with a 0 offset and the destination memory with a +1 offset.
FIG. 8D is a graphical representation of a six byte transfer between a source memory with a +3 offset and a destination memory with a +2 offset.

FIG. 8B is a graphical illustration of the shifter 26 of FIGS. 6A–6D for four fields (N=4) of bytes (B=8). The FIG. 8B shifter 26 comprises 8 copies (B copies) of the shifter $26c_7$–$26c_0$ of FIG. 8A stacked on top of one another, each shifter having two storage elements ($32a_7 \ldots 32a_0$, $32b_7 \ldots 32b_0$ and $32c_7 \ldots 32b_0$) and four 4:1 multiplexers ($34a_7 \ldots 34a_0$, $34b_7 \ldots 34b_0$, $34c_7 \ldots 34c_0$ and $34d_7 \ldots 34d_0$).

FIG. 8C is illustrative of an eight byte transfer between a source memory with a 0 offset and a destination memory with a +1 offset when N=4 and B=8. The destination offset $D_{offset}$ is greater than source offset $S_{offset}$, and hence, $S=D_{offset}-S_{offset}=1$. Further, the source and destination counter values equal 8. The following Pipelined Operation Table III illustrates the operation of the shifter 26 for reading, storing and writing the fields of valid field signals indicated in the VALID column specifying which outputs $Y_3$, $Y_2$, $Y_1$, and $Y_0$ are valid for writing:

| | | READ | | | SRC | STORE | | | WRITE | | | | DST |
|---|---|---|---|---|---|---|---|---|---|---|---|---|---|
| OP # | $I_3$ | $I_2$ | $I_1$ | $I_0$ | CNTR | $I_2'$ | $I_1'$ | $I_0'$ | VALID | $Y_3$ | $Y_2$ | $Y_1$ | $Y_0$ | CNTR |
| START | | | | | 8 | | | | | | | | | 8 |
| 1 | A | B | C | D | 4 | B | C | D | VW | | A | B | C | 5 |
| 2 | E | F | G | H | 0 | F | G | H | WW | D | E | F | G | 1 |
| 3 | | | | | 0 | | | | V | H | | | | 0 |

The operation cycles of the FIG. 8B shifter 26 is similar to the operation cycles of the FIG. 7B shifter 26b. FIG. 8D graphically illustrates the transfer of the six bytes A, B, C, D, E and F when the destination memory offset $D_{offset}$ is less than the source memory offset $S_{offset}$. The source memory has a +3 offset, and the destination memory has a +2 offset and hence, the selector signal S equals three ($D_{offset}-S_{offset}+N=2-3+4=3$), and the initial transfer count of the source and destination counters equals 6. The following Pipelined Operation Table IV illustrates the FIG. 8D transfer:

| | | READ | | | SRC | STORE | | | WRITE | | | | DST |
|---|---|---|---|---|---|---|---|---|---|---|---|---|---|
| OP # | $I_3$ | $I_2$ | $I_1$ | $I_0$ | CNTR | $I_2'$ | $I_1'$ | $I_0'$ | VALID | $Y_3$ | $Y_2$ | $Y_1$ | $Y_0$ | CNTR |
| START | | | | | 6 | | | | | | | | | 6 |
| 1 | | | | A | 5 | | | A | | | | | | 6 |
| 2 | B | C | D | E | 1 | C | D | E | VV | | | A | B | 4 |
| 3 | F | | | | 0 | | | | WW | C | D | E | F | 0 |

Figure 9:
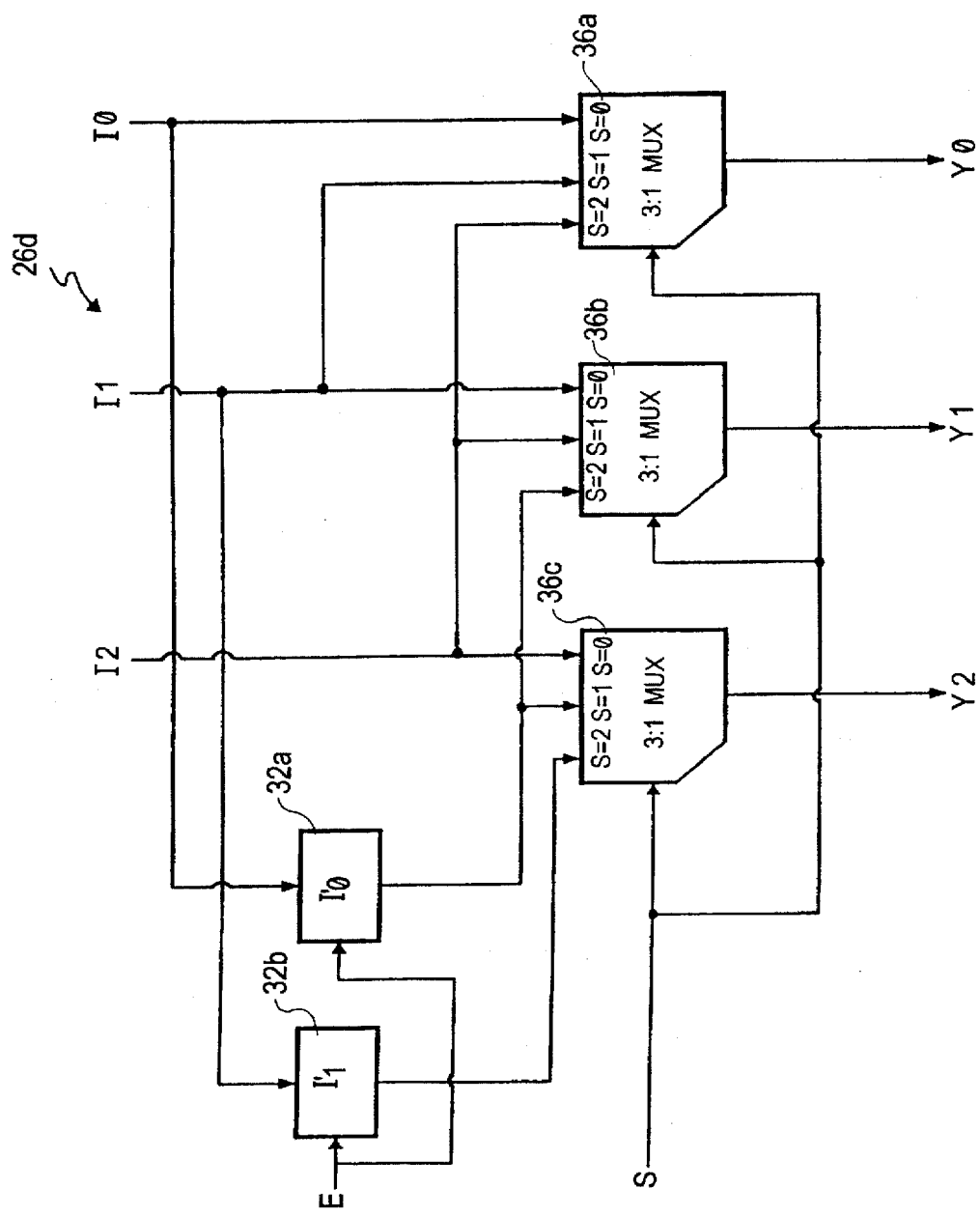
FIG. 9 is a block diagram of a shifter when the number fields is an odd integer, i.e., N=3.

While the present invention has been described in specific embodiments thereof, it is evident that many alternatives, modifications and variations will be apparent to those skilled in the art. For example, the number of fields N is generally an integer power of 0.2, but can be an odd number, as illustrated in FIG. 9.

A shifter 26d is used when the number of fields N equals 3 and the number of bits B equals 1. The FIG. 9 shifter 26d comprises three 3:1 multiplexers 36a, 36b and 36c and two storage elements 32a and 32b. As in the previous embodiment, the outputs Y can be expressed as a function of the stored data I', inputs I and selector signal S in the following Multiplexer Selection Table 3:

TABLE 3

| Multiplexer Selection | | |
|---|---|---|
| S = 0 | S = 1 | S = 2 |
| $Y_0 = I_0$ | $Y_0 = I_1$ | $Y_0 = I_2$ |
| $Y_1 = I_1$ | $Y_1 = I_2$ | $Y_1 = I'_0$ |
| $Y_2 = I_2$ | $Y_2 = I'_0$ | $Y_2 = I'_1$ |

When operating the FIG. 9 shifter, the inputs $I_1$ and $I_2$ are first provided as the outputs $Y_0$ and $Y_1$, respectively, and then after one operation cycle, the stored input $I'_0$ is provided as the output $Y_2$ if there is an offset difference of one between the source and destination memories (S=1). As can be appreciated, the outputs Y can be shifted by one with respect to the inputs I to compensate for the offset difference of one between the source and destination memories.

Similarly, when there is an offset difference of two between the source and destination memories (S=2), the inputs $I_0$ and $I_1$ are stored in the storage elements 8a and 8b, respectively, for one operation cycle while the input $I_2$ is provided as the output $Y_0$. Thereafter, the stored inputs $I'_0$ and $I'_1$ are provided as the outputs $Y_1$ and $Y_2$, respectively. Hence, the output Y can be shifted by two with respect to the input I.

Further, the pipelined alignment shiftier can be used to transfer data within a memory. The present invention can be also applied to non-byte data such as four 6-bit audio samples packed into 24 bit words. Hence, the present invention is not limited to byte base configuration and also not limited to even number of bits.

What is claimed is:

1. A peripheral controller for transferring a string of data between source and destination memory locations organized as N fields of B bits, where N and B are positive integers and N is greater than one, comprising:

storing means for storing at least one selected output from a source memory location;

receiving means receiving outputs of said source memory location and the at least one selected output from said storing means;

outputting means coupled to said receiving means for selectively outputting said outputs of said source memory location and said storing means as said N fields of B bits to a destination memory location in response to a plurality of selector signals indicative of offset differences between said source and destination memory locations such that all possible combinations of offset difference are compensated during transfer of said string of data; and a plurality of counters coupled to said outputting means for monitoring a first number of fields of B bits outputted from said source memory location and a second number of fields of B bits inputted into said destination memory location.

2. The pipelined alignment shifter of claim 1, wherein said storing means comprises B copies of N–1 storage elements, each of said storage elements receives and stores a different binary input from said source memory location.

3. The pipelined alignment shifter of claim 2, wherein said receiving and outputting means comprise B copies of N multiplexers, said multiplexers being N to 1 multiplexers.

4. The pipelined alignment shifter of claim 3, wherein each copy of said N multiplexers having an input connection pattern as follows: the first of said N multiplexers receiving as inputs N binary outputs from said source memory location, the second of said N multiplexers receiving as inputs (N–1) binary outputs from said source memory location and one binary output from one storage element of said storage means, the third of said N multiplexers receiving as inputs (N–2) binary outputs from said source memory location and two binary outputs from two storage elements of said storage means, and so on such that the Nth of said N multiplexers receiving as inputs one binary output from said source memory location and (N–1) binary outputs from (N–1) storage elements of said storage means.

5. The pipelined alignment shifter of claim 1, wherein said plurality of selector signals have a value of (destination memory offset–source memory offset) when said destination memory offset is greater than or equal to said source memory offset and a value of (destination memory offset–source memory offset+N) when said destination memory offset is less than said source memory offset.

6. The pipelined alignment shifter of claim 5, wherein said destination and source memory offsets are based on (Log2 (N)) least significant bits of a beginning memory address of said source and destination memory locations.

7. A peripheral controller coupled to a computer system main memory via a system bus, comprising:

a) a local memory;

b) transferring means coupled to said local memory for controlling the transfer between said local and main memories;

c) a first counter monitoring a first number of fields of B bits output from a source memory location;

d) a second counter monitoring a second number of fields of B bits input to a destination memory location; and e) a pipelined alignment shifter coupled to said transferring means, said pipelined alignment shifter transferring a string of data between said local and main memories organized as N fields of B bits, where N and B are positive integers and N is greater than one, said pipelined alignment shifter comprising:

i) storing means receiving as inputs selected outputs of said source memory location for storing said selected outputs of said source memory location;

ii) receiving means receiving as inputs outputs of said source memory location and said storing means; and iii) outputting means coupled to said receiving means for selectively outputting said outputs of said source memory location and said storing means as said N fields of B bits to said destination memory location based on a plurality of selector signals indicative of offset differences between said source and destination memory locations such that all possible combinations of offset difference are compensated during transfer of said string of data.

8. The peripheral controller of claim 7, wherein said storing means comprises B copies of N–1 storage elements, each of said storage elements receives and stores a different binary input from said source memory location.

9. The peripheral controller of claim 8, wherein said receiving and outputting means comprise B copies of N multiplexers, said multiplexers being N to 1 multiplexers.

10. The peripheral controller of claim 9, wherein each copy of said N multiplexers having an input connection pattern as follows: the first of said N multiplexers receiving as inputs N binary outputs from said source memory location, the second of said N multiplexers receiving as inputs (N–1) binary outputs from said source memory location and one binary output from one storage element of said storage means, the third of said N multiplexers receiving as inputs (N–2) binary outputs from said source memory location and two binary outputs from two storage elements of said storage means, and so on such that the Nth of said N multiplexers receiving as inputs one binary output from said source memory location and (N–1) binary outputs from (N–1) storage elements of said storage means.

11. The peripheral controller of claim 7, wherein said plurality of selector signals have a value of (destination memory offset–source memory offset) when said destination memory offset is greater than or equal to said source memory offset and a value of (destination memory offset–source memory offset+N) when said destination memory offset is less than said source memory offset.

12. The pipelined alignment shifter of claim 11, wherein said destination and source memory offsets are based on (Log2(N)) least significant bits of a beginning memory address of said source and destination memory locations.

13. A method for pipeline transferring a string of data between source and destination memory locations organized as N fields of B bits, where N and B are positive integers and N is greater than one, comprising:
  a) generating a plurality of selector signals indicative of offset differences between said source and destination memory locations such that all possible combinations of offset difference are compensated during pipeline transfer of the string of data;
  b) supplying N fields of B bits from a location of said source memory to corresponding inputs of a plurality of multiplexers;
  c) selectively storing at least one of said fields in a storage element;
  d) supplying the stored at least one field from the corresponding storage element to a corresponding at least one of said multiplexers;
  e) selectively outputting said stored at least one field and said supplied N fields from the respective multiplexers in response to said plurality of selector signals.

14. The method of claim 13 wherein said selector signal generating step comprising:
  a) determining a destination memory offset value based on (Log2(N)) least significant bits of a beginning memory address of said destination memory location;
  b) determining a source memory offset value based on (Log2(N)) least significant bits of a beginning memory address of said source memory location; and
  c) determining a value of said selector signal based on said source and destination memory offset values, wherein said selector signal value is equal to (destination memory offset–source memory offset) when said destination memory offset is greater than or equal to said source memory offset and (destination memory offset source–source memory offset+N) when said destination memory offset is less than said source memory offset.

15. The method of claim 13 further comprising the steps of:
  monitoring a first count value indicative of a number of fields of B bits outputted from said source memory
  monitoring a second count value indicative of a number of fields of B bits inputted into said destination memory; and
  repeating steps (b)–(d) until all of said fields of B bits from said source memory location are transferred.

16. A peripheral controller for transferring a string of data between source and destination memories organized as N fields of B bits, where N and B are positive integers and N is greater than one, comprising:
  a plurality of storage elements coupled to said source memory, said plurality of storage elements receiving as inputs selected outputs of said source memory;
  a plurality of multiplexers coupled to said source memory and said plurality of storage elements, said plurality of multiplexers receiving as inputs outputs of said source memory location and said storage elements, said plurality of multiplexers selectively outputting said outputs of said source memory and said plurality of storage elements to said destination memory as said N fields of B bits based on a plurality of selector signals indicative of offset differences between said source and destination memories such that all possible combinations of offset difference are compensated during transfer of string of data; and
  a first counter coupled to said source memory for monitoring a number of fields of B bits outputted from said source memory; and
  a second counter coupled to said destination memory for monitoring a number of fields of B bits inputted into said destination memory.

17. The pipelined alignment shifter of claim 16, wherein said plurality of storage elements comprises B copies of N–1 storage elements, each of said storage elements receives and stores a different binary input from said source memory.

18. The pipelined alignment shifter of claim 17; wherein said plurality of multiplexers comprise B copies of N multiplexers, said multiplexers being N to 1 multiplexers.

19. The pipelined alignment shifter of claim 18, wherein each copy of said N multiplexers having an input connection pattern as follows: the first of said N multiplexers receiving as inputs N binary outputs from said source memory, the second of said N multiplexers receiving as inputs (N–1) binary outputs from said source memory and one binary output from one of said plurality of storage elements, the third of said multiplexers receiving as inputs (N–2) binary outputs from said source memory and two binary outputs from two of said plurality of storage elements, and so on such that the Nth multiplexers receiving as inputs one binary output from said source memory and (N–1) binary outputs from (N–1) of said plurality of storage elements.

20. The pipelined alignment shifter of claim 16, wherein said selector signal has a value of (destination memory offset–source memory offset) when said destination memory offset is greater than or equal to said source memory offset and a value of (destination memory offset–source memory offset+N) when said destination memory offset is less than said source memory offset.

21. The pipelined alignment shifter of claim 20, wherein said destination and source memory offsets are based on (Log2(N)) least significant bits of a beginning memory address of said source and destination memory.

22. A peripheral controller coupled to a computer system main memory via a system bus, comprising:

a) a local memory;

b) memory controller coupled to said local memory; and c) a pipelined alignment shifter coupled to said memory controller, said pipelined alignment shifter transferring a string of data between said local and main memories organized as N fields of B bits, where N and B are positive integers and N is greater than one, said pipelined alignment shifter comprising:

i) a plurality of storage elements coupled to said source memory, said plurality of storage elements receiving as inputs selected outputs of said source memory;

ii) a plurality of multiplexers coupled to said source memory and said plurality of storage elements, said plurality of multiplexers receiving as inputs outputs of said source memory and said storage elements, said plurality of multiplexers selectively outputting said outputs of said source memory and said plurality of storage elements to said destination memory as said N fields of B bits based on a plurality of selector signals indicative of offset differences between said source and destination memories such that all possible combinations of offset difference are compensated during transfer of string of data;

d) a first counter coupled to said source memory for monitoring a number of fields of B bits outputted from said source memory; and e) a second counter coupled to said destination memory for monitoring a number of fields of B bits inputted into said destination memory.

23. A method of direct memory transfer (DMA) from a source memory location to a destination memory location, comprising:

determining a boundary alignment difference between the source memory location and the destination memory location, the source and memory locations having respective first and second boundary alignments, each memory location having a full field width comprising a predetermined number of fields;

reading a first full field having said full field width from the source memory location, the first full field comprising at least one valid data field according to said first boundary alignment;

selectively shifting the fields of the first full field in a pipelined shifter in response to said boundary alignment difference;

outputting from the pipelined shifter a second full field having said full field width and at least a first portion of the first full field, including said at least one valid data field, according to said second boundary alignment.

24. The method of claim 23, wherein the pipelined shifter comprises a plurality of multiplexers corresponding to said predetermined number of fields, the shifting step comprising the steps of:

supplying the fields of the first full field, including the first portion of the first full field, to the respective multiplexers;

selectively storing in said pipelined shifter a second portion of the first full field in accordance with the determined boundary alignment difference;

selectively shifting the first portion of the first full field in response to selection inputs supplied to the multiplexers; and outputting from the multiplexers the second full field.

25. The method of claim 24, further comprising:

supplying a third full field having said predetermined number of fields from the source memory location to the multiplexers;

supplying the stored second portion of the first full field to the multiplexers; and selectively outputting from the multiplexers, in response to second selection inputs, a third full field comprising the stored second portion of the first full field and a portion of the third full field shifted in accordance with said second boundary alignment.

26. The method of claim 23, further comprising the steps of:

counting a number of fields to be written to said destination memory location; and generating field valid signals for each field of the second full field in response to the number of fields to be written and at least a portion of a destination memory location.

27. The method of claim 23, wherein:

the pipelined shifter comprises storage elements;

the selectively shifting step comprises delaying in the storage elements a second portion of the first full field; and the method further comprises outputting from the pipelined shifter a third full field comprising the delayed second portion of the first full field.

28. A peripheral controller transferring a string of data between a source memory and a destination memory, the source and destination memory each having a word length of N fields of B bits, the controller comprising:

a control portion determining a boundary alignment difference between the source and destination memory and outputting a selector signal in response to the determined boundary alignment difference and said word length, the source and destination memory each having a corresponding boundary alignment at corresponding addresses; and a pipelined alignment shifter receiving from the source memory a first full field having said word length, the first full field including at least one valid data field, the pipelined alignment shifter comprising:

(1) a first memory selectively storing a first field group from said first full field in response to a store enable signal, and (2) a plurality of multiplexers selectively outputting the first full field from said source memory and stored fields output from the first memory in response to said selector signal.

29. The controller of claim 28, wherein said control portion comprises a source counter counting a first number of fields to be read from the source memory and a destination counter counting a second number of fields to be written to the destination memory.

* * * * *